United States Patent
Wang

(10) Patent No.: US 11,112,526 B2
(45) Date of Patent: Sep. 7, 2021

(54) WAVEFORM PROCESSING UTILIZING AN AMPLITUDE ADAPTIVE DATA MASK

(71) Applicant: Halliburton Energy Services, Inc., Houston, TX (US)

(72) Inventor: Ruijia Wang, Singapore (SG)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 16/731,655

(22) Filed: Dec. 31, 2019

(65) Prior Publication Data
US 2020/0271821 A1 Aug. 27, 2020

(51) Int. Cl.
| | | |
|---|---|---|
| *G01V 3/34* | (2006.01) | |
| *G01V 3/30* | (2006.01) | |
| *E21B 47/00* | (2012.01) | |
| *G01V 3/38* | (2006.01) | |
| *G01V 3/12* | (2006.01) | |

(52) U.S. Cl.
CPC ............... *G01V 3/34* (2013.01); *E21B 47/00* (2013.01); *G01V 3/12* (2013.01); *G01V 3/30* (2013.01); *G01V 3/38* (2013.01)

(58) Field of Classification Search
CPC ... G01V 3/34; G01V 3/12; G01V 3/30; G01V 3/38; E21B 47/00
See application file for complete search history.

(56) References Cited

U.S. PATENT DOCUMENTS

| | | | |
|---|---|---|---|
| 6,205,087 B1 * | 3/2001 | Fukuhara | G01V 1/48 367/69 |
| 6,901,332 B2 | 5/2005 | Hill | |
| 7,649,805 B2 | 1/2010 | Bose et al. | |
| 9,523,784 B2 | 12/2016 | Orban | |
| 10,175,375 B2 * | 1/2019 | Mukhopadhyay | G01V 1/48 |
| 2009/0323470 A1 | 12/2009 | Ferris | |
| 2010/0177594 A1 | 7/2010 | Bose et al. | |
| 2011/0188345 A1 | 8/2011 | Wang | |
| 2013/0238248 A1 | 9/2013 | Aeron et al. | |
| 2014/0169130 A1 | 6/2014 | Aeron et al. | |
| 2016/0291189 A1 | 10/2016 | Collins | |
| 2018/0196156 A1 | 7/2018 | Assous et al. | |

FOREIGN PATENT DOCUMENTS

| | | | |
|---|---|---|---|
| WO | 9713166 A1 | 4/1997 | |
| WO | 2017205075 A1 | 11/2017 | |
| WO | WO-2018111256 A1 * | 6/2018 | G01V 1/284 |

* cited by examiner

*Primary Examiner* — Franklin D Balseca
(74) *Attorney, Agent, or Firm* — Benjamin Ford; Parker Justiss, P.C.

(57) ABSTRACT

The disclosure is directed to waveform processing methods for collected sonic logging data. The data can be collected from various types of well systems. The methods utilize an amplitude analysis, utilizing the collected data, to build an adaptive data mask. The adaptive data mask can then be applied to a semblance analysis of the collected data to suppress or partially suppress alias data elements. A threshold parameter can be utilized to eliminate intensity values that do not satisfy the threshold criteria. The adaptive data mask can utilize amplitude or instantaneous amplitude analysis. Also, disclosed is a computer program product capable of executing the methods and algorithms described herein. A waveform processing system is disclosed that can perform the methods and algorithms as described herein.

20 Claims, 16 Drawing Sheets

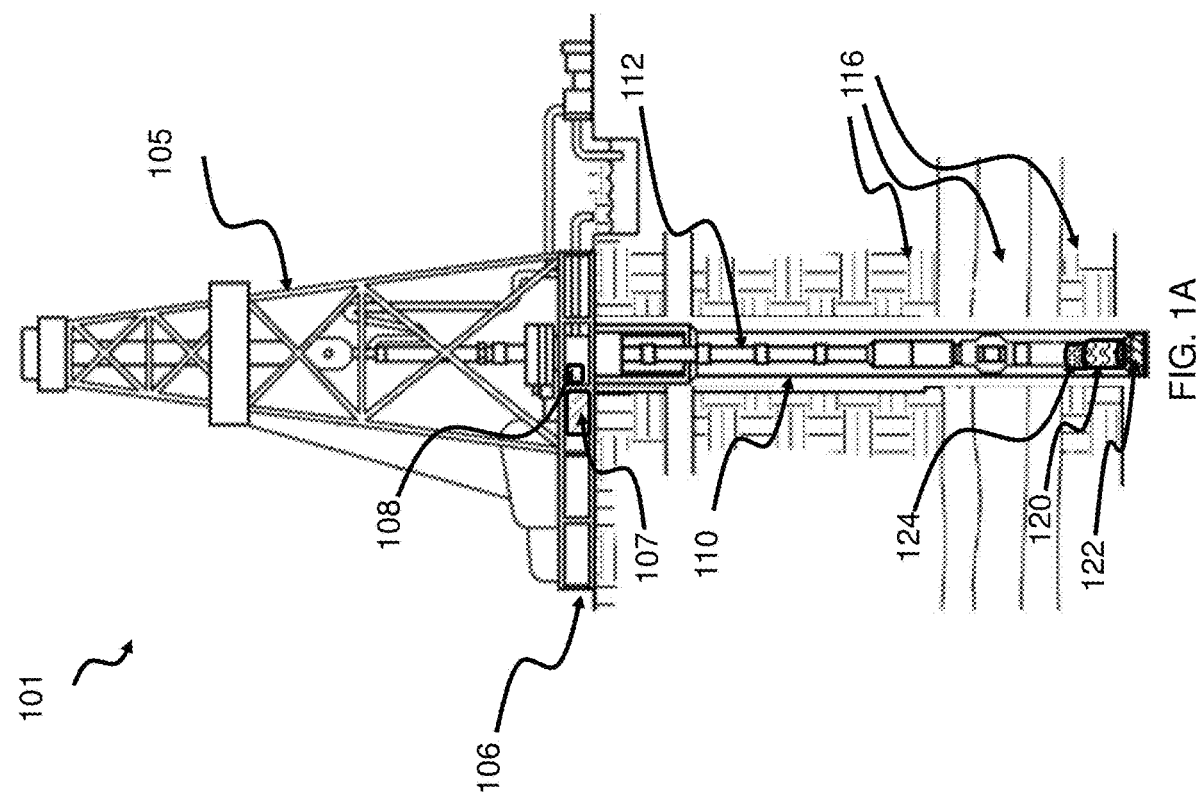

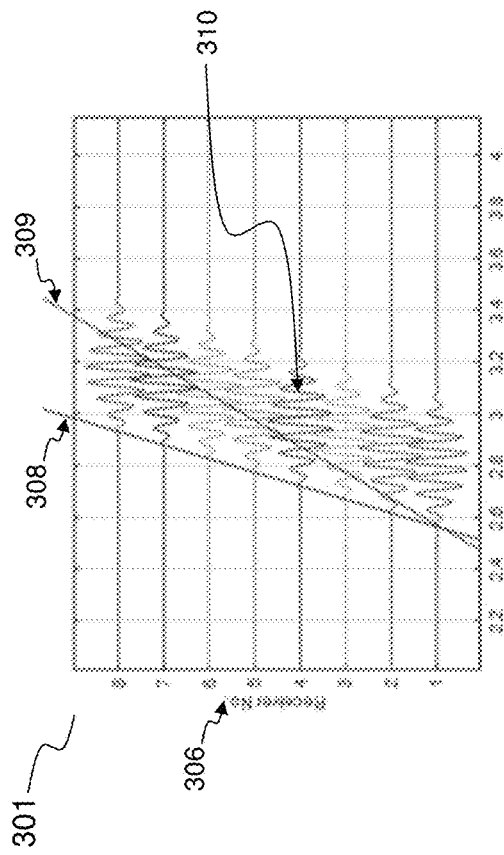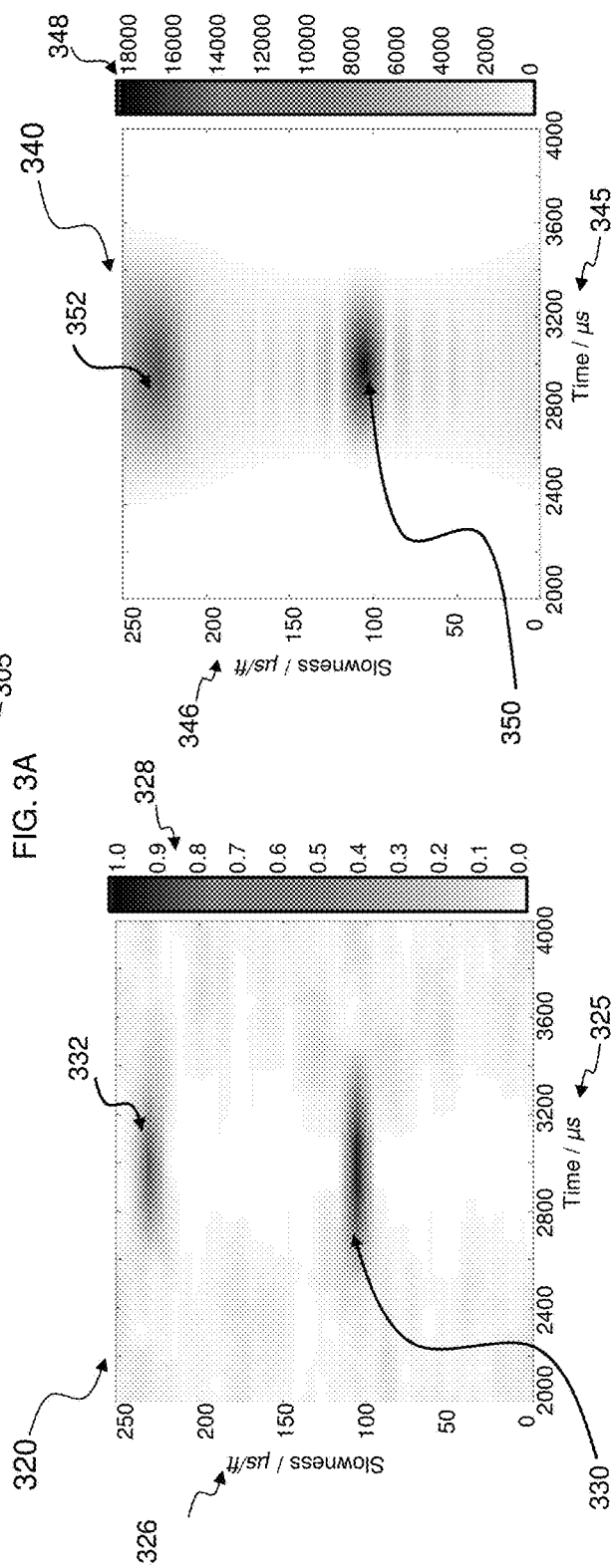
FIG. 3A
FIG. 3B
FIG. 3C

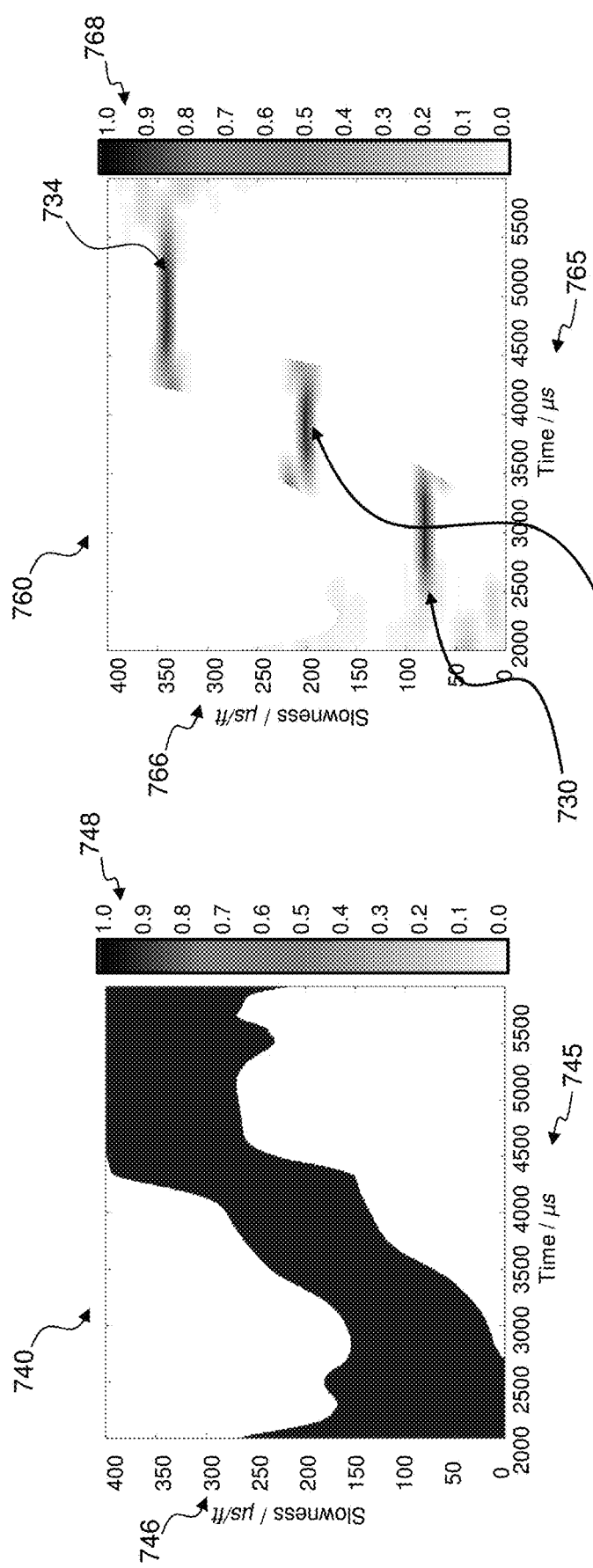

WAVEFORM PROCESSING UTILIZING AN AMPLITUDE ADAPTIVE DATA MASK

CROSS-REFERENCE TO RELATED APPLICATION

This application is a continuation of and claims priority to International Application Serial No. PCT/US2019/018935 filed on Feb. 21, 2019, and entitled "WAVEFORM PROCESSING UTILIZING AN AMPLITUDE ADAPTIVE DATA MASK," is commonly assigned with this application and incorporated herein by reference in its entirety.

TECHNICAL FIELD

This application is directed, in general, to a waveform processing method and, more specifically, to processing sonic logging data using waveform semblance processing.

BACKGROUND

Sonic tools often use different borehole modes to extract the mechanical/petrophysical properties of a subterranean formation. Modes are borehole guided waves propagating along the borehole axis. While analyzing the slowness values collected from the sonic logging data, data masks can be used to help isolate true slowness values from alias values. Alias values, or noise artifacts, can interfere with the analysis of the data and lead to incorrect conclusions regarding the subterranean formation. User defined masks can be too narrow, eliminating good data values, or too broad, allowing too many alias values. A more efficient method for employing a data mask can result in a better resultant data set that can be used for more accurate analysis.

SUMMARY

In one aspect, the disclosure provides a method of processing sonic logging data detected by a sonic tool in a well system to minimize an influence of alias data. In one example, the method includes: (1) transforming to a first data set the sonic logging data, wherein the transforming targets a time slowness domain, (2) generating an adaptive data mask, wherein the adaptive data mask utilizes an amplitude analysis of the first data set, and (3) computing a second data set, utilizing the adaptive data mask, wherein the second data set represents a semblance analysis.

In another aspect, the disclosure provides a computer program product having a series of operating instructions stored on a non-transitory computer-readable medium that direct a data processing apparatus when executed thereby to perform operations to process sonic logging data detected from a well system. In one example, the operations include: (1) transforming the sonic logging data to a first data set, wherein the transforming targets a time slowness domain, (2) generating an adaptive data mask, wherein the adaptive data mask utilizes an amplitude analysis of the first data set, and (3) computing a second data set, utilizing the adaptive data mask, wherein the second data set represents a semblance analysis.

In yet another aspect, the disclosure provides a waveform processing system for sonic logging data for a well system. In one example, the system includes: (1) a data source, configured to store the sonic logging data, and (2) a processor, configured to transform the sonic logging data to a first data set that targets a time slowness domain, generate an adaptive data mask that utilizes an amplitude analysis of the first data set, and compute a second data set utilizing the adaptive data mask, wherein the second data set represents a semblance analysis.

BRIEF DESCRIPTION

Reference is now made to the following descriptions taken in conjunction with the accompanying drawings, in which:

FIG. 1A is an illustration of a diagram of an example logging while drilling (LWD) well system;

FIG. 3A is an illustration of a graph of an example plot of sonic logging data waveforms;

FIG. 3B is an illustration of a graph of an example semblance map;

FIG. 3C is an illustration of a graph of an example amplitude map;

FIG. 7C is an illustration of a graph of an example adaptive data mask for an instantaneous amplitude correlation;

FIG. 7D is an illustration of a graph of an example semblance map after an instantaneous amplitude data mask has been applied demonstrating multiple modes;

DETAILED DESCRIPTION

Figure 1B:
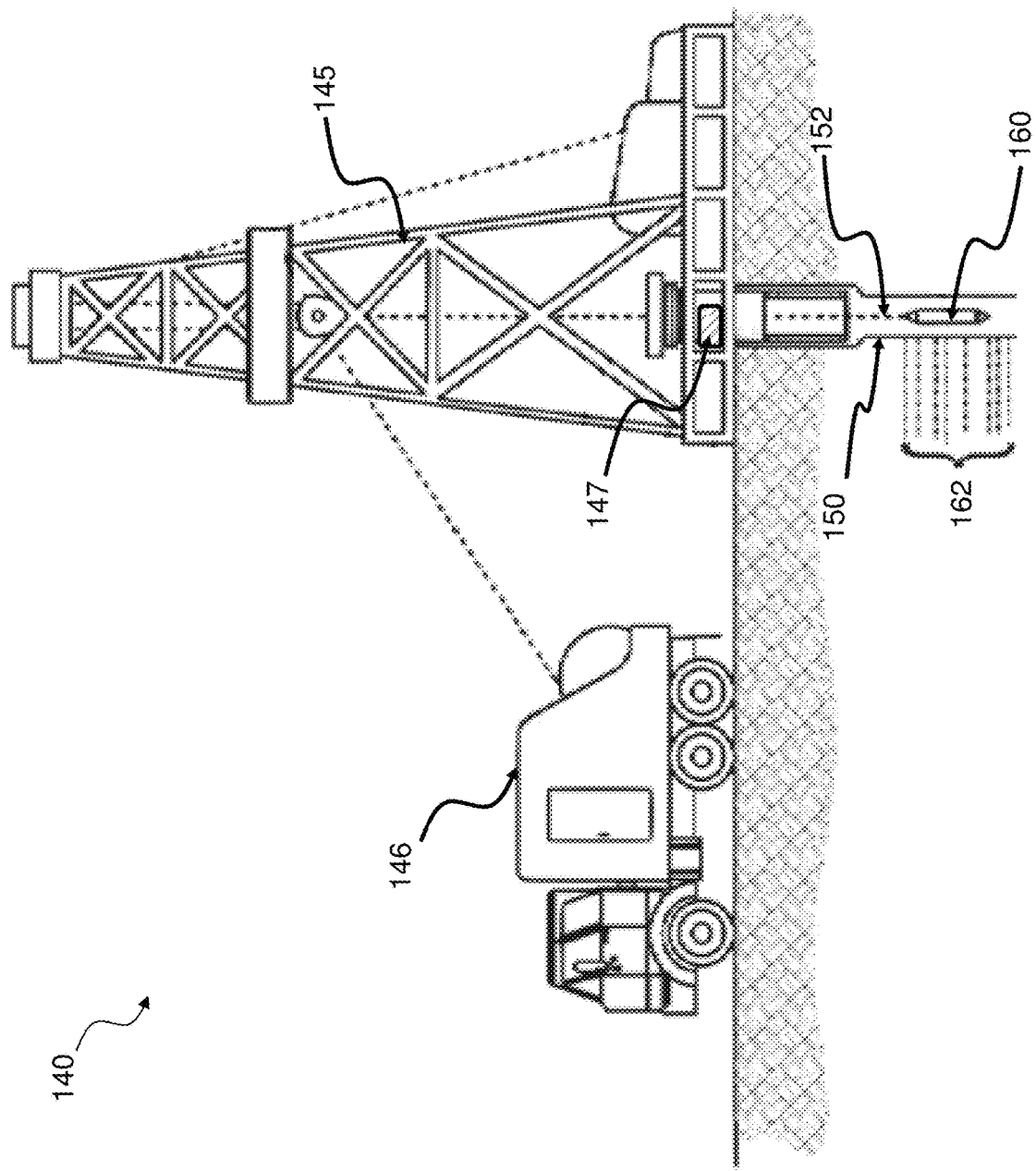
FIG. 1B is an illustration of a diagram of an example wireline (WL) well system.

In well systems, such as logging while drilling (LWD) and wireline (WL) well systems, there can be a need to analyze the surrounding subterranean formations. Various logging tools can be used to gather data to perform the analyzation. For example, a sonic tool, such as a sonde can be used. The sonic tool can emit sonic energy, as waves, which, as they pass through the surrounding subterranean formations, can be altered in respect to the time taken to transit a distance. Such sonic wave alterations can be detected by sonic receivers as sonic logging data and transformed to waveform data, i.e., waveforms. The sonic receivers can be part of the sonic tool or separate receivers located proximate to or a distance from the sonic tool. There are at least two sonic receivers as part of the sonic detection system.

The waveform data can be collected into a first set of data and processed by a waveform data processor. The output from the waveform data processor can be a second set of data that can be utilized in further analysis and processing by the well system controllers, logging facility, or other computing systems, such as a cloud data center, a data center, a proximate or remote server, computer, handheld device, tablet, smartphone, and other computing systems. The first set of data that is collected can contain data reflective of the true state of the subterranean formation, and data that are aliases, i.e., virtual modes due to under sampling in spatial domain, also referred to as noise, of the true state of the subterranean formation.

To remove or lessen the impact of the alias data on analysis, a data mask can be generated to filter out unwanted data values from the collected first data set. Conventional waveform data processing uses a fixed data mask. A fixed data mask can achieve acceptable results where the subterranean formation between the sonic transmitter to the first receiver, and the subterranean formation near the receiver array have similar wave slowness. Where the subterranean formation is more heterogeneous, the correct, i.e., true, data values can be incorrectly filtered out by the fixed data mask. This problem can be exacerbated by the use of a long-spaced short receiver array.

Wave amplitude or group slowness, i.e., the slowness of the envelope, or energy, of the waves propagating in the spatial domain, is not necessarily sensitive to aliasing. Therefore, the wave amplitude or instantaneous amplitude can be used to generate an adaptive amplitude data mask, i.e., an adaptive data mask. The adaptive data mask can result in a greater percentage of the true data values being unfiltered and a greater percentage of the alias data elements being filtered out or partially suppressed, as compared to a fixed data mask. The adaptive data mask can minimize the influence of alias data when conducting additional analysis.

In this disclosure, an adaptive data mask generation method is described that can be used for waveform data processing. In other aspects, an adaptive data mask can be generated using beamforming. In other aspects, an adaptive data mask can be generated using instantaneous amplitude correlation between sonic receivers. These enhancements can result in: a reduction of an error rate due to a lack of experience in working with the sonic logging data, an improvement of the overall efficiency of sonic logging data processing, and a greater automation of the time-domain waveform processing through lessening the need for human intervention to generate the applied data mask.

For general sonic logging data processing, waveform data is often converted to a time slowness domain generating a coherence or semblance map with coherence or semblance processing. Semblance processing is a process that is commonly used for refining seismic or sonic logging data when the data is detected from reflections off of varying layers and various types of subterranean formations. Usually, the semblance map includes true mode peaks and alias peaks of true modes. These peaks can be mixed, i.e., peaks being overlapping or juxtaposed, across the time slowness domain and therefore can be difficult to identify.

The various peaks can be identified by using an intensity parameter. Intensity can be a relative intensity of the data values collected from the sonic tool. The intensity, for example, can range from 0.0 to 1.0, inclusive. The higher the intensity parameter, the more intense the data value, i.e., a larger data value for a time slowness data element. The intensity parameter can be compared across the data values in the data set and be used with the adaptive data mask. For example, an intensity of 0.7 or higher can be likely representative of the true slowness values and not alias values. A threshold parameter, such as 0.7, can be utilized to eliminate or suppress data elements that fall below this threshold. Other intensity or threshold parameters can be utilized, for example, 0.5 or 0.8. In some aspects, to increase the processing automation, the threshold parameter can be determined to be ½ of the maximum intensity value for the collected data set. Other threshold fractional proportions can be used as well.

Conventionally, a fixed data mask can be applied to reject peaks incompatible with the linear relationship between travel time and slowness, which is built on the assumption of a homogeneous or close-to-homogeneous subterranean formation. The fixed data mask can work well for homogeneous subterranean formations. When encountering strong heterogeneous subterranean formations, the fixed data mask may remove true data values of the subterranean formation modes, and thus may provide incorrect slowness estimates. The issue can be exacerbated when long-spaced short arrays are utilized, where the alias semblance peak values may be expected to be very close to the true peak values due to long time duration of each wave. Utilizing an adaptive data mask for strong heterogeneous subterranean formations can avoid mis-estimating the subterranean formation modes. Modes are types of wave motions that can be represented by some of the properties of the data. For example, a mode can be identified by the change in time of compression waves (the slowness of compression waves), the change of time of shear waves (the slowness of shear waves), the change of time of Stoneley waves, and other mode types.

A data mask for waveform processing can be defined by four points on the time slowness mask graph. For fixed data masks, these four points can be defined through human interaction with the waveform processing system. For automated systems, the points can be calculated using the travel time given an assumed propagating slowness, as demonstrated by Equation 1.

Equation 1: Example adaptive data mask definition $$TT = Z_f s + L_{mud} s_{mud} + TT_{pulse}$$

where TT represents travel time of the mode with a speed of s, $Z_f$ denotes propagating distance in the subterranean formation, s is the slowness of the formation waves, therefore $Z_f s$ represents the propagating time delay in the subterranean formation, $L_{mud}$ represents the propagating path in mud, $s_{mud}$ represents mud slowness, therefore $L_{mud}s_{mud}$ represents the travel time in the borehole fluid, i.e., the well bore mud, and $TT_{pulse}$ represents pulse delay, the value differs due to varying drive pulses.

The minimum slowness of the computing range can be defined as $TT_{sMIN}$ and the maximum slowness of the computing range can be defined as $TT_{sMAX}$. To account for the heterogeneity of the formation, a time range can be defined for the minimum and maximum time values. Equation 2 is an example of a time range for a minimum time value. Equation 3 is an example of a time range for a maximum time value.

Equation 2: Example start and end times for minimum slowness $$TT_{sMIN}^{start} = TT_{sMIN} * a_{sMIN}^{Start} + b_{sMIN}^{Start}$$

$$TT_{sMIN}^{end} = TT_{sMIN} * a_{sMIN}^{End} + b_{sMIN}^{End}$$

Equation 3: Example start and end times for maximum slowness $$TT_{sMAX}^{start} = TT_{sMAX} * a_{sMAX}^{Sart} + b_{sMAX}^{Start}$$

$$TT_{sMAX}^{end} = TT_{sMAX} * a_{sMAX}^{End} + b_{sMAX}^{End}$$

where $a*_*$ and $b*_*$, are empirical parameters for generating a time slowness adaptive data mask that can cover wave motions of interest in the semblance map. For example, values that can be used are:

$a_{sMIN}^{Start} = 0.9$ $b_{sMIN}^{Start} = -100$ $a_{sMIN}^{End} = 1.47$ $b_{sMIN}^{End} = 400$ $a_{sMAX}^{Start} = 0.8$ $b_{sMAX}^{Start} = -300$ $a_{sMAX}^{End} = 1.4$ $b_{sMAX}^{End} = 0$ where the unit for $TT*_*$ and $b*_*$ is microseconds (μs), and $a*_*$ is unitless.

Generating a time slowness adaptive data mask can utilize various algorithms One option can be to compute the time slowness mask from amplitude stacking, i.e., beamforming. This can be implemented by stacking the amplitude to form the beam of target waves. The waveform data can be stacked to the time slowness axis for the two-dimensional (2D) amplitude map, as shown in Equation 4. A second option can be to compute the time slowness mask from an instantaneous amplitude correlation.

Equation 4: Example amplitude stacking of waveform data $$WAV(T,S) = |\Sigma_{i=1}^{m} WAV_i(T,S)|$$

$$AMP(T,S) = ENV_T(WAV(T,S))$$

where AMP(T,S) is the 2D amplitude map, $ENV_T$ represent taking the envelope of the signals in the time axis, m is the number of waveforms being stacked, T is the time, S is the slowness value, and i is a counter value.

Comparing a semblance map to the amplitude map, the amplitude map can be more sensitive to alias peaks while having low accuracy in determining slowness. This feature of the amplitude map can be utilized in the adaptive data mask generation process. Equation 5 demonstrates an example of how the mask can be calculated.

$$\text{Mask}(T, S) = \begin{cases} 0 & AMP(T, S) < AMP_{thr} \\ \left(\frac{AMP(T, S)}{\text{MAX}[AMP(T, S)]}\right)^2 & AMP(T, S) \geq AMP_{thr} \end{cases} \quad \text{Equation 5}$$

where $AMP_{thr}$ represents a threshold of the amplitude, and the data below this threshold can be rejected by the adaptive data mask.

The adaptive data mask generation process can be applied where multiple modes exist, i.e., there are more than one mode existing in the waveform data. The adaptive data mask can be overlaid on the multi-mode semblance results to filter out unwanted waveform data.

As noted above, another aspect can be to utilize instantaneous amplitude correlation to generate an adaptive data mask. Waveform data can be input to the system, after which a filter is applied to reduce noise and nontarget wave modes. Then, a transform can be applied, for example a Hilbert transform. The transform can be utilized to generate analytic signals of the raw real waveforms, and instantaneous phase and amplitude can be calculated from the analytic signals. Next, the instantaneous phase can be processed by a semblance processing, for example, differential phase time semblance (DPTS), and gain a phase semblance map.

Separately, the instantaneous amplitude can be filtered by a low-frequency band-pass filter. The filter helps achieve a stable map for the follow-on processes. A semblance processing can be performed on the instantaneous amplitude after filtering. For example, to perform the semblance processing, the instantaneous amplitude can be a new data set of the waveform, and generate the instantaneous phase of this new dataset, and then perform DPTS. Next, an amplitude-semblance map can be generated. Compared to the general phase-semblance map, the amplitude-semblance map has low-resolution and limited aliases, which allows building an adaptive data mask. Equation 6 demonstrates an example calculation of an instantaneous amplitude correlation data mask, which is a type of adaptive data mask.

Equation 6: Example instantaneous amplitude correlation data mask generation $$\text{Mask}(T, S) = \begin{cases} 0 & Semb_{AMP}(T, S) < Semb_{AMP}^{thr} \\ 1 & Semb_{AMP}(T, S) \geq Semb_{AMP}^{thr} \end{cases}$$

where Mask (T,S) is the adaptive data mask for the time T/slowness S map point, $Semb_{AMP}(T,S)$ is the semblance map value for the time T/slowness S data element, and $Semb_{AMP}^{thr}$ is an applied threshold parameter.

Applying the adaptive data mask on the phase-semblance map yields an alias-free semblance map. The target mode can be identified from the remaining peaks in the final phase-semblance map. This method can be a supplement to conventional semblance processing methods, which may discard the amplitude information of the raw waveform data, which includes group slowness of the borehole modes. In addition, since the slowness gained from the amplitude-semblance map is closely related to the modal group slowness, in order to let the adaptive data mask accurately constrain the phase-semblance map, the group slowness can be expected to be close to the phase slowness for selected modes. Therefore, this method can apply to non-dispersive or weak-dispersive waves.

In another aspect, two or more adaptive data masks can be defined. For example, a wide data mask and an instantaneous amplitude correlation data mask can be defined to suppress aliases. Where the wide data mask is wider than a conventional data mask, the combined adaptive data mask can provide for a larger tolerance for heterogeneous subterranean formations.

Turning now to the figures, FIG. 1A is an illustration of a diagram of an example LWD well system 101. LWD well system 101 can incorporate drilling operations while performing logging operations of the borehole and surrounding subterranean formations. A drilling platform 106 supports a derrick 105, where the derrick 105 controls a drill string 112. A drill bit 122 can be driven by a downhole motor and/or rotation of drill string 112. As drill bit 122 rotates, it can create a borehole 110 that passes through various subterranean formations 116.

A downhole tool 120, such as a sonic tool, can be integrated into the bottom-hole assembly near drill bit 122. As the drill bit 122 extends the borehole through the subterranean formations 116, the downhole tool 120 collects sonic logging data. Downhole tool 120 can take the form of a drill collar, i.e., a thick-walled tubular component that provides weight and rigidity to aid the drilling process or other arrangements known in the art.

For purposes of communication, a downhole telemetry transceiver 124 can be included in the bottom-hole assembly, either separately or as part of downhole tool 120. Downhole telemetry transceiver 124 can transfer measurement data to a surface transceiver 108 and to receive commands from the surface. Mud pulse telemetry is one common telemetry technique for transferring tool measurements to surface receivers and receiving commands from the surface. Other telemetry techniques can also be used. In some embodiments, downhole telemetry transceiver 124 can store logging data for later retrieval at the surface when the logging assembly is recovered.

At the surface, surface transceiver 108 can receive the uplink signal from the downhole telemetry transceiver 124 and can communicate the signal to well controller equipment 107. Well controller equipment 107 can include one or more processors, storage mediums, input devices, output devices, software, and other computing components and systems. Well controller equipment 107 can collect, store, and/or process the data received from downhole tool 120 as described herein. For example, the well controller equipment 107 can process sonic logging data such as disclosed herein.

FIG. 1B is an illustration of a diagram of an example wireline well system 140. At various times during the drilling process, the drill string can be removed from the borehole. Once the drill string has been removed, logging operations can be conducted using a wireline logging tool. Wireline well system 140 includes well equipment 145, a surface transceiver 147, and a logging facility 146. Below well equipment 145 is a borehole 150 with a logging tool 160 suspended by cable 152.

Logging tool 160, such as a sensing instrument sonde suspended by the cable 152, can have conductors for transporting power to the tool and telemetry from the tool to the surface, such as to surface transceiver 147. Logging tool 160 can have pads and/or centralizing springs to maintain the tool near the central axis of the borehole or to bias the tool towards the borehole wall as the tool is moved downhole or uphole.

Logging tool 160 can include a sonic logging data instrument that collects sonic logging data within the borehole from formations 162. A logging facility 146 includes a computer system for collecting, storing, and/or processing the measurements gathered by logging tool 160. For example, the logging facility 146 can process the sonic logging data such as disclosed herein.

Although FIGS. 1A and 1B depict specific borehole configurations, those skilled in the art will understand that the present disclosure is equally well suited for use in wellbores having other orientations including vertical wellbores, horizontal wellbores, slanted wellbores, multilateral wellbores, and other wellbore types. FIGS. 1A and 1B depict an onshore operation. Those skilled in the art will understand that the present disclosure is equally well suited for use in offshore operations. Those skilled in the art will also understand that the disclosure is not limited to the environments depicted in FIGS. 1A and 1B, and can also be used, for example, in other well operations such as production tubing operations, jointed tubing operations, coiled tubing operations, combinations thereof, and other well operation types.

Figure 1C:
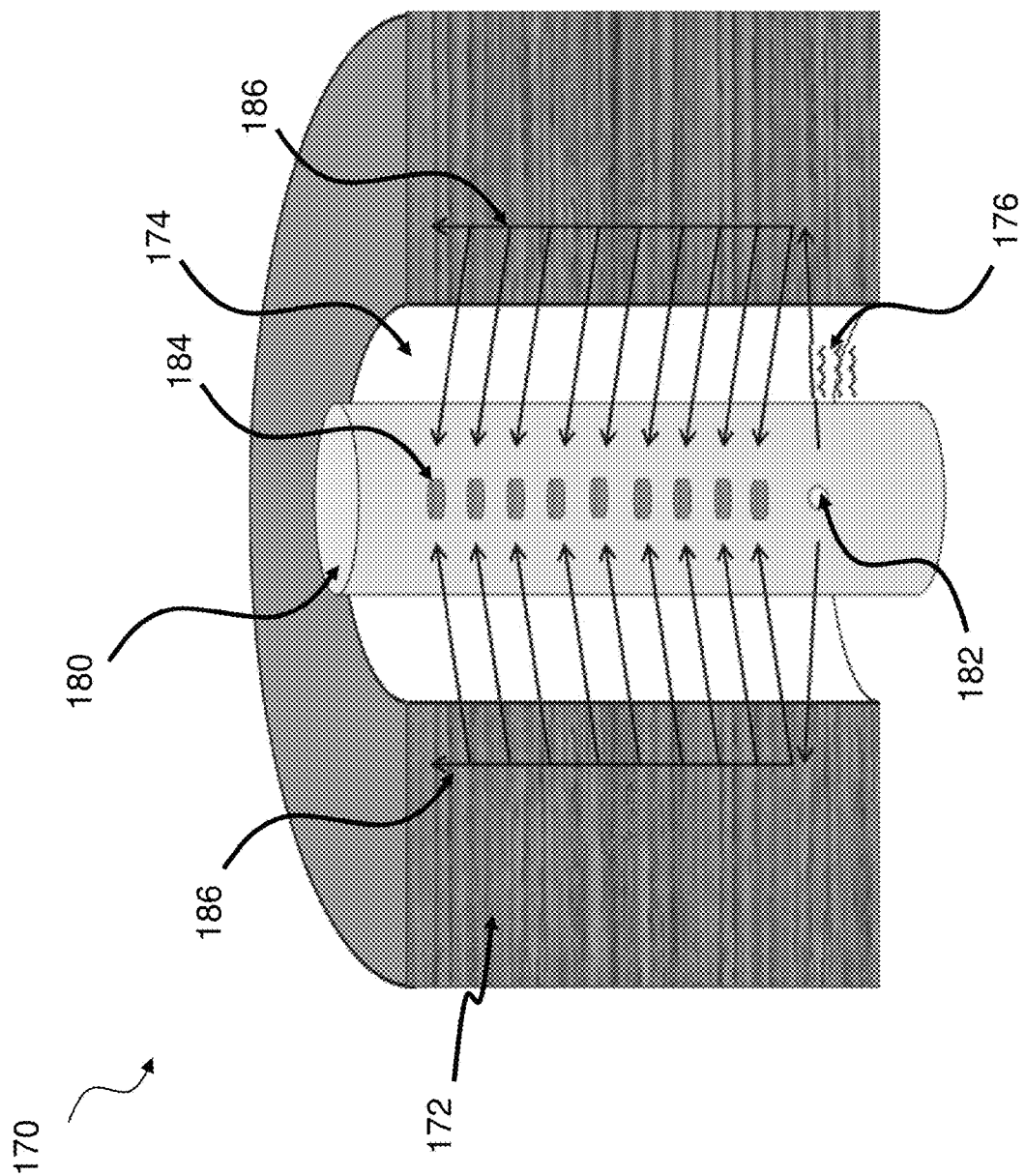
FIG. 1C is an illustration of a diagram of an example sonic tool deployed in a borehole of a well system.

FIG. 1C is an illustration of a diagram of an example sonic tool deployed in a bore hole of a well system 170. Well system 170 demonstrates a borehole drilled into a rock formation, and a WL or LWD sonic tool deployed in the fluid-filled borehole. The sonic tool includes at least one transmitter and two receivers. The transmitted and received signals could be monopole, dipole or quadrupole, depending on the target waves of the logging measurements. The transmitter emits acoustic signals into the borehole and subterranean formations. Those waves, propagating along the borehole, are captured by the receiver array. This disclosure enhances the signal processing of the captured signals for better inversions of the subterranean formation acoustic properties. The disclosed aspects apply to an adaptive amplitude data mask on the semblance map to suppress alias data elements.

Well system 170 includes a borehole 174 through a subterranean formation 172. Subterranean formation 172 can be a homogeneous or heterogenous subterranean formation. Inserted within borehole 174 is a sonic tool 180. In some aspects, there can be a fluid 176 within borehole 174. Sonic tool 180 can have a transmitter 182 capable of transmitting sound energy 186, and receivers 184 capable of detecting the reflected and refracted sound energy. In alternate aspects, receivers 184 can be part of a separate tool from the sonic tool 180, and can be located proximate to or a distance from sonic tool 180. In other aspects, one or more receivers 184 can be part of sonic tool 180 and zero or more receivers 184 can be located as part of a separate tool.

The transmitter 182 can generate sound energy 186 that is then reflected and refracted by the surrounding subterranean formation 172. The changes in the sound energy detected by the receivers 184, such as a phase change and the time difference between detection by the various receivers 184, can be captured and used to generated the waves as used in the demonstrations herein.

Figure 2:
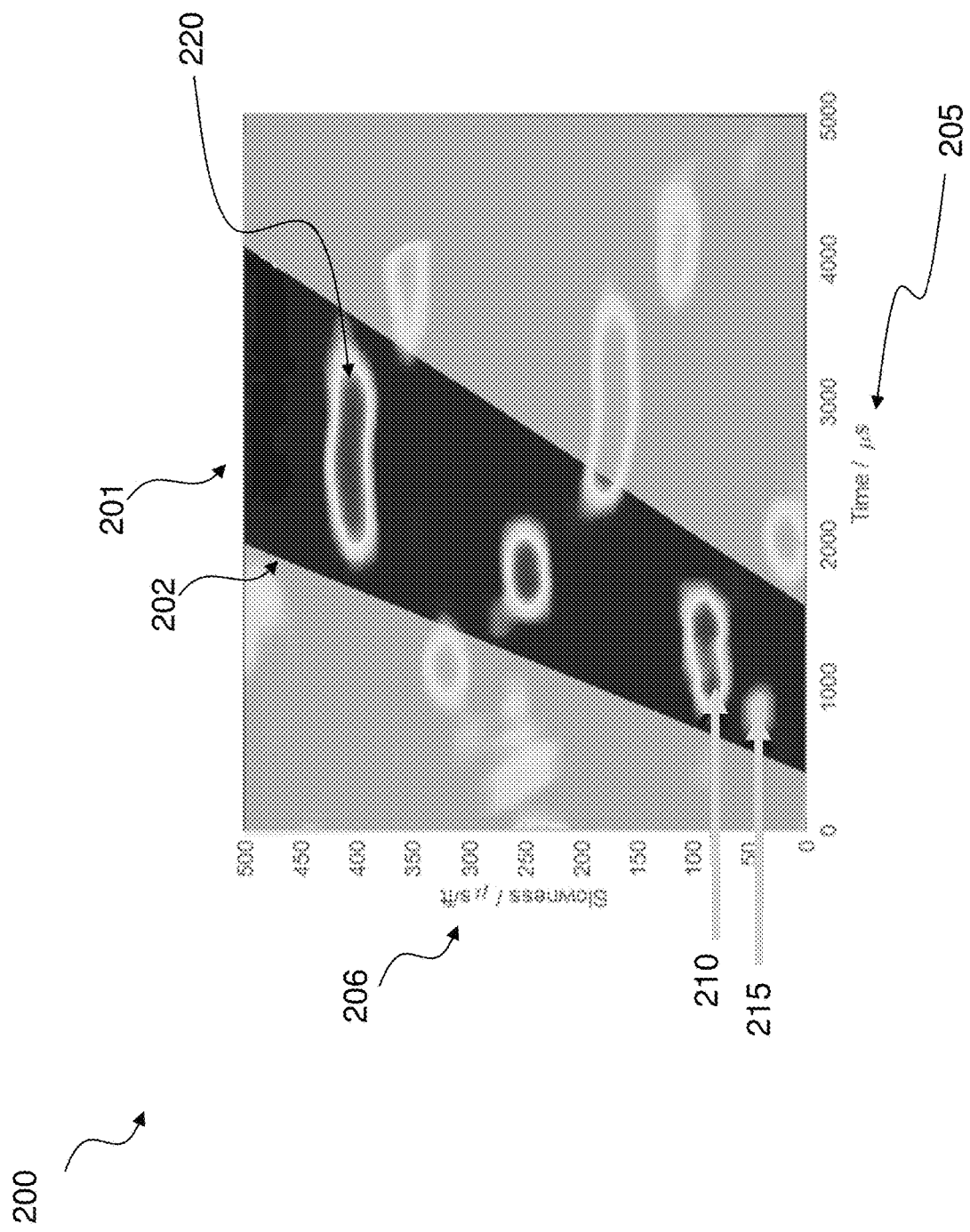
FIG. 2 is an illustration of a graph of an example differential phase time semblance (DPTS) map with a time slowness adaptive data mask.

FIG. 2 an illustration of a graph of an example DPTS map 200. DPTS map 200 demonstrates an example of DPTS with a time slowness adaptive data mask. DPTS map 200 includes a graph 201 that has an x-axis 205 indicating a time in µs, a y-axis 206 indicating slowness, i.e., reciprocal of the wave speed, in µs per foot (µs/ft). Adaptive data mask 202 is overlaid on graph 201 to highlight the waves that are likely to be of interest for further analysis. Element 210 indicates a waveform change over time for a shear wave. Element 215 indicates a waveform change over time for a compressional wave.

Coherence peaks 220, with local maximums, indicate that there can be a mode propagating with the slowness associated with the peak. Note that there can be a significant number of alias peaks in the graph 201. Typically, the travel time and slowness values associated with the alias peaks are not consistent. They are not true modes propagated from the transmitter to the receiver. Thus, the alias and noise peaks can be rejected by applying the time slowness adaptive data mask 202 on the propagation of the mode from the transmitter to the receiver, assuming the formation is approximately homogeneous.

FIGS. 3A to 3C illustrate a waveform plot, a semblance map, and an amplitude map that represent simplified views of data that can be collected from a sonic tool. FIG. 3A is an illustration of a graph of an example waveform plot 301 of sonic logging data. Waveform plot 301 has an x-axis 305 indicating time in milliseconds (ms), and a y-axis 306 indicating receivers by an identification number. Each receiver has detected sonic logging data 310 and has indicated an approximate amplitude around each receiver indicator line. Line 308 indicates the true slowness of the subterranean formation. Line 309 indicates the slowness as represented by detected alias peaks. Line 309 is the first order aliases. An adaptive data mask can assist in suppressing the detected alias values so that a calculated time slowness parameter can be more accurately representative of the true time slowness parameter.

FIG. 3B is an illustration of a graph of an example semblance map 320. Semblance map 320 includes an x-axis 325 indicating time in µs, and a y-axis 326 indicating slowness as µs/ft. A relative intensity reference 328 is shown to the side of semblance map 320. Waves from waveform plot 301 can be projected on semblance map 320 resulting in a true slowness visualization 330 and an alias visualization 332, corresponding to the lines 308 and 309, respectively.

FIG. 3C is an illustration of a graph of an example amplitude map 340. Amplitude map 340 includes an x-axis 345 indicating time in µs, and a y-axis 346 indicating slowness as µs/ft. A relative intensity reference 348 is shown to the side of amplitude map 340. Waves from waveform plot 301 can be plotted on amplitude map 340 resulting in a true slowness visualization 350 and an alias visualization 352, corresponding to the lines 308 and 309, respectively.

Semblance map 320 and amplitude map 340 are demonstrating that a true slowness parameter can be distinct and have a value significantly differing from an alias slowness parameter. Suppressing the alias slowness parameter can improve the overall analysis results. Waveform plot 301, semblance map 320, and amplitude map 340 represent a simplified view of the potential data collected from a sonic tool. In practice, the various maps can be more data dense with overlapping waveform data.

Figure 4:
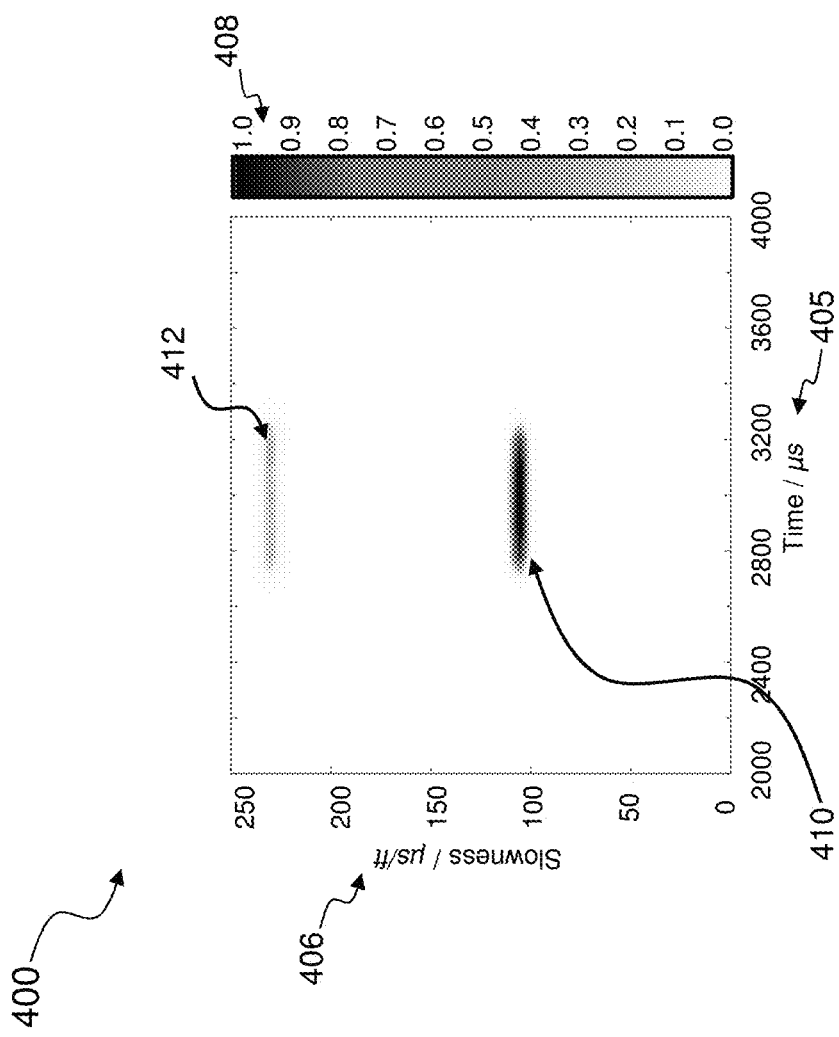
FIG. 4 is an illustration of a graph of an example semblance map after a time slowness adaptive data mask has been applied.

FIGS. 4 to 7D illustrate various graphs or plots of sonic logging data waveforms, semblance maps, amplitude maps, and adaptive data masks. FIG. 4 is an illustration of a graph of an example semblance map 400 after a time slowness adaptive data mask has been applied. Semblance map 400 includes an x-axis 405 indicating time in µs, and a y-axis 406 indicating slowness as µs/ft. A relative intensity reference 408 is shown to the side of semblance map 400. Waves from waveform plot 301 are plotted on semblance map 400 resulting in a true slowness visualization 410 and an alias visualization 412. An adaptive data mask, generated employing Equation 5 and based on the data in FIG. 3C, has been applied to semblance map 400, which can be visualized by the lower intensity of alias visualization 412 compared to the intensity as visualized in alias 332 on semblance map 320. Using an adaptive data mask threshold parameter, data values, such as those represented by alias visualization 412 can be suppressed if they fail to satisfy the threshold criteria.

Figure 5B:
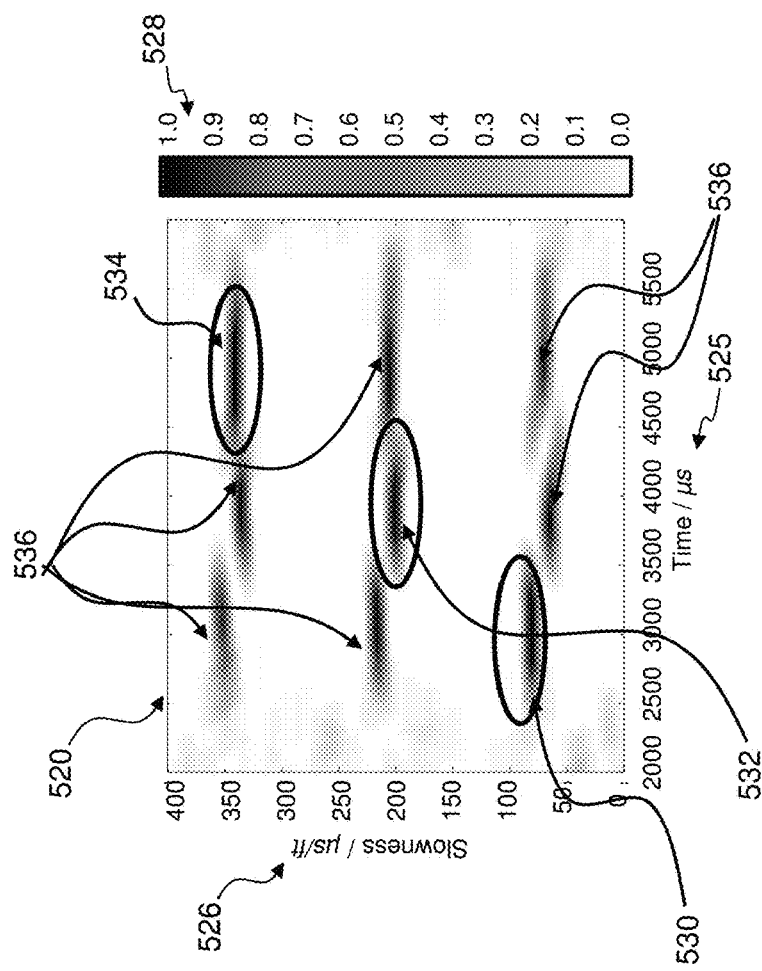
FIG. 5B is an illustration of a graph of an example semblance map demonstrating multiple modes.
Figure 5A:
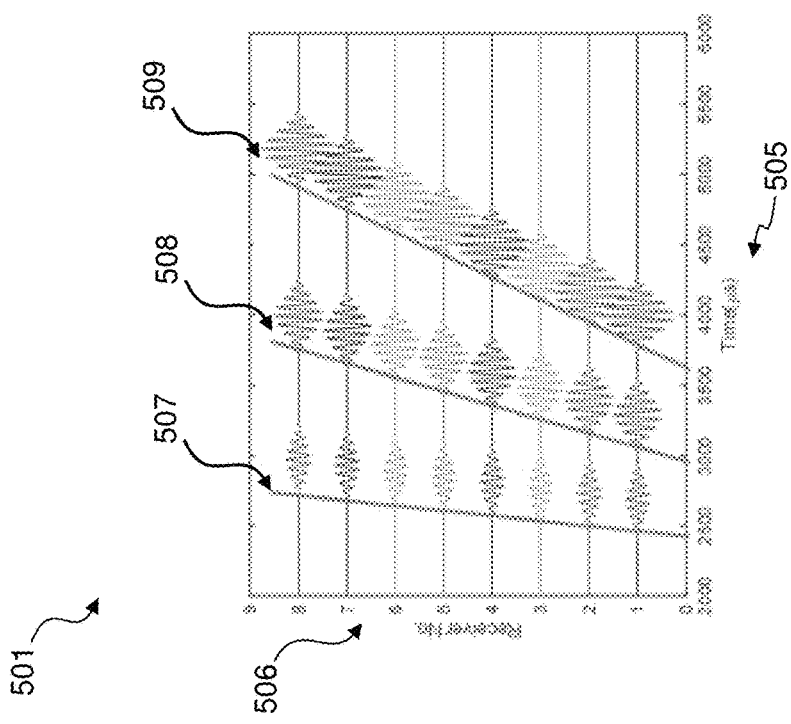
FIG. 5A is an illustration of a graph of an example plot of sonic logging data waveforms for three different modes.

FIG. 5A is an illustration of a graph of an example waveform plot 501, of sonic logging data, for three different modes. Each of the modes is shown with different propagating slowness parameters. Waveform plot 501 is demonstrating three modes, for example, compression waves, shear waves, and an third mode, which can be Stoneley waves. In practice, there can be one or more modes utilized. The number of modes depends on the capabilities of the sonic tools used. Waveform plot 501 has an x-axis 505 indicating time in µs, and a y-axis 506 indicating receivers by an identification number. Each receiver has detected sonic logging data, the process has transformed the data to waveforms, and has indicated an approximate amplitude around each receiver indicator line. Slowness lines 507, 508, and 509 indicate the approximate slowness parameter for each of the three modes plotted.

FIG. 5B is an illustration of a graph of an example semblance map 520 demonstrating multiple modes. Each of the modes is showing a true slowness parameter and first and second order alias slowness parameters. These alias slowness parameters can be partially suppressed if a proper time slowness adaptive data mask is applied. Semblance map 520 includes an x-axis 525 indicating time in µs, and a y-axis 526 indicating slowness as µs/ft. A relative intensity reference 528 is shown to the side of semblance map 520. Waveforms from waveform plot 501 can be plotted on semblance map 520 resulting in true slowness visualizations 530, 532, and 534—one for each of the modes used. Alias visualizations are shown by elements 536 on the semblance map 520.

Figures 5C, 5D:
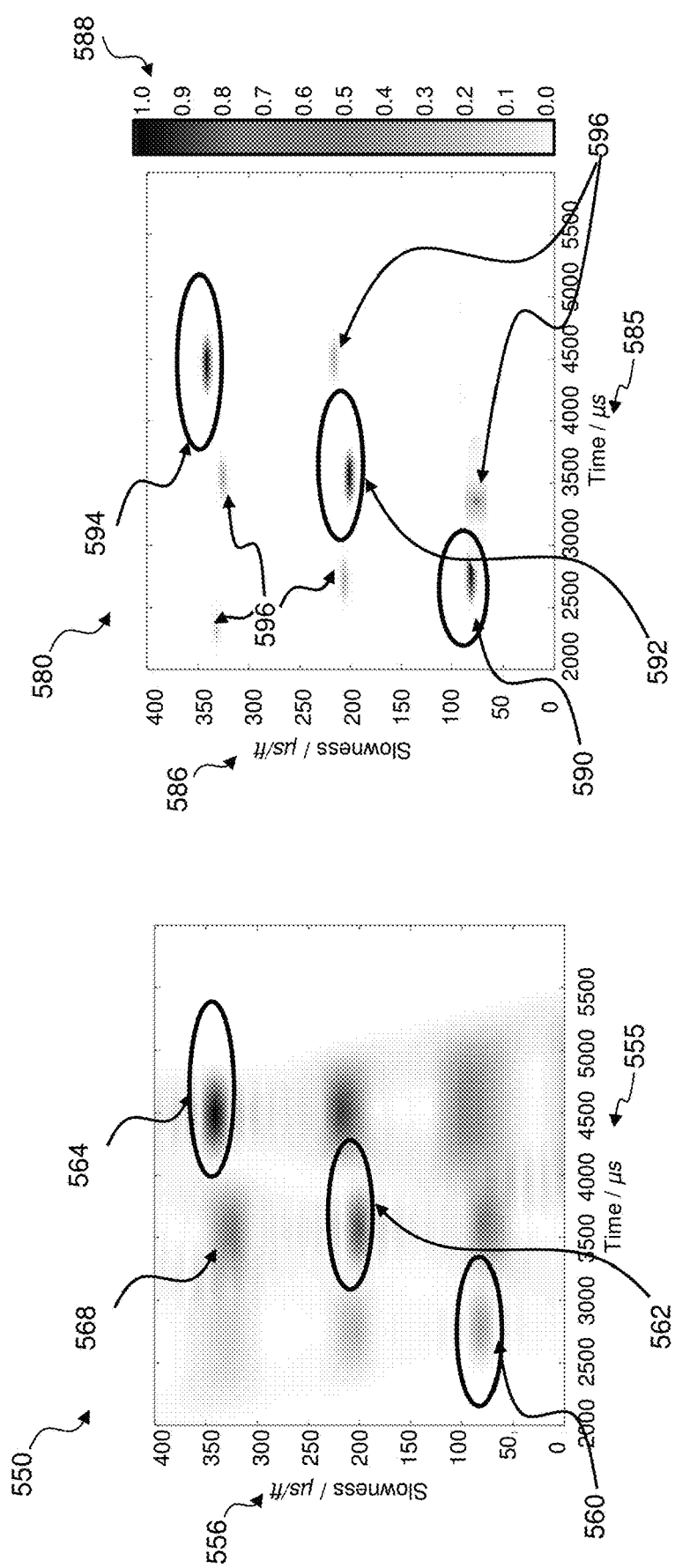
FIG. 5C is an illustration of a graph of an example amplitude map demonstrating multiple modes.
FIG. 5D is an illustration of a graph of an example semblance map after a time slowness adaptive data mask has been applied demonstrating multiple modes.

FIG. 5C is an illustration of a graph of an example amplitude map 550 demonstrating multiple modes Amplitude map 550 includes an x-axis 555 indicating time in µs, and a y-axis 556 indicating slowness as µs/ft. Waveforms from waveform plot 501 can be plotted on amplitude map 550 resulting in true slowness visualizations 560, 562, and 564, and alias visualizations 568. The amplitude map 550 can be utilized to generate the adaptive data mask used to suppress or partially suppress alias data elements.

FIG. 5D is an illustration of a graph of an example semblance map 580 after a time slowness adaptive data mask has been applied demonstrating multiple modes. Semblance map 580 includes an x-axis 585 indicating time in µs, and a y-axis 586 indicating slowness as µs/ft. A relative intensity reference 588 is shown to the side of semblance map 580. Waves from waveform plot 501 can be plotted on semblance map 580 resulting in true slowness visualizations 590, 592, and 594, and alias visualizations 596. In semblance map 580, an adaptive data mask, generated from the data in FIG. 5C by equation 5, has been applied. Alias visualizations 596 are muted in intensity compared to the true slowness visualizations 590, 592, and 594. When the alias data is suppressed below a threshold parameter, the true slowness parameters can be identified by the algorithm.

Figures 6A, 6B:
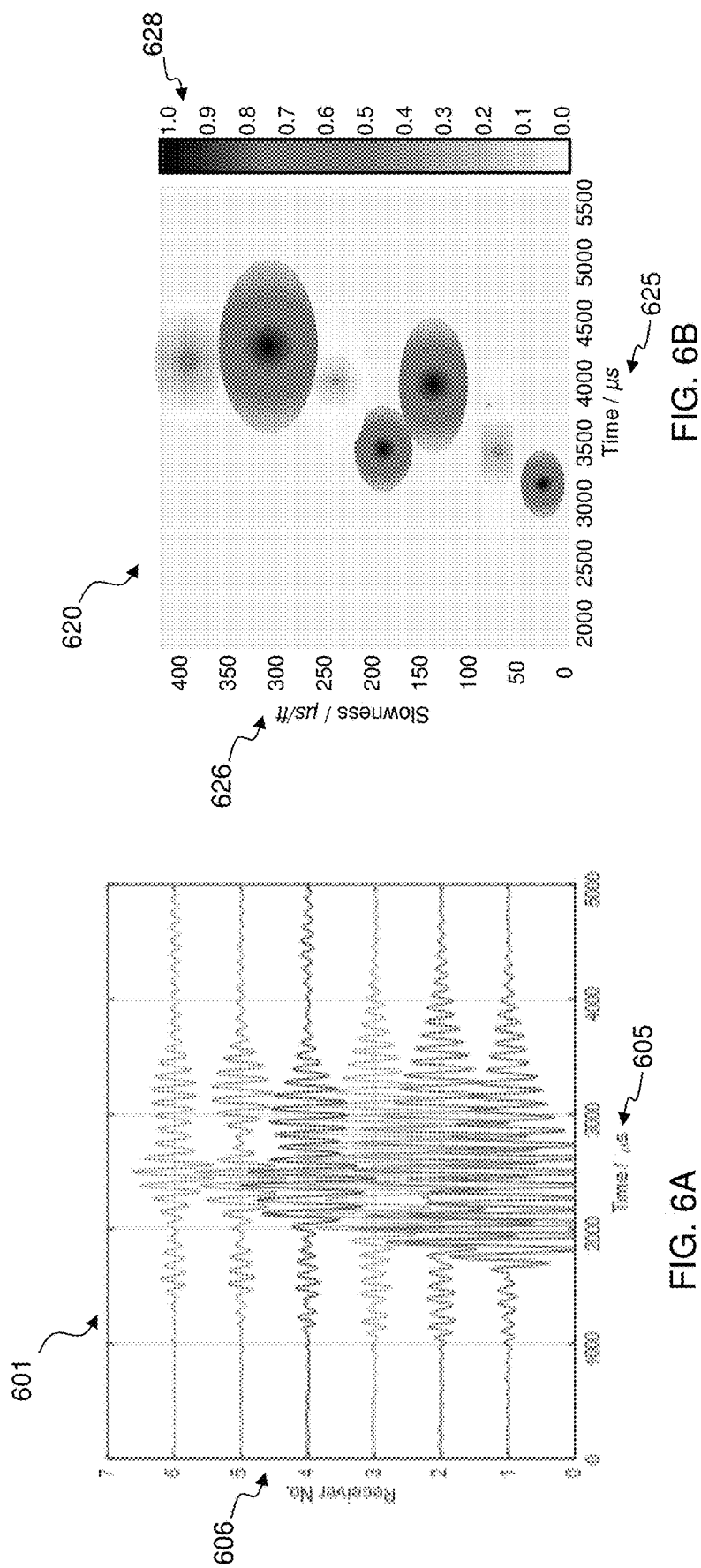
FIG. 6A is an illustration of a graph of an example plot of sonic logging data waveforms for an LWD well system.
FIG. 6B is an illustration of a graph of an example amplitude map demonstrating an LWD well system.

FIG. 6A is an illustration of a graph of an example waveform plot 601, of sonic logging data, for an LWD well system. Waveform plot 601 is demonstrating a greater variety of detected sound waves, represented by the various waveforms depicted. Waveform plot 601 has an x-axis 605 indicating time in µs, and a y-axis 606 indicating receivers by an identification number. Each receiver has detected sonic logging data, the process has transformed the data to waveforms, and has indicated an approximate amplitude around each receiver indicator line.

FIG. 6B is an illustration of a graph of an example amplitude map 620 demonstrating an LWD well system. Amplitude map 620 includes an x-axis 625 indicating time in µs, and a y-axis 626 indicating slowness as µs/ft. A relative intensity reference 628 is shown to the side of amplitude map 620. Waveforms from waveform plot 601 can be plotted on amplitude map 620 resulting in a visualization of the amplitude intensity. The amplitude map 620 can be utilized to generate the time slowness adaptive data mask that can subsequently be applied to the semblance map.

Figures 6C, 6D:
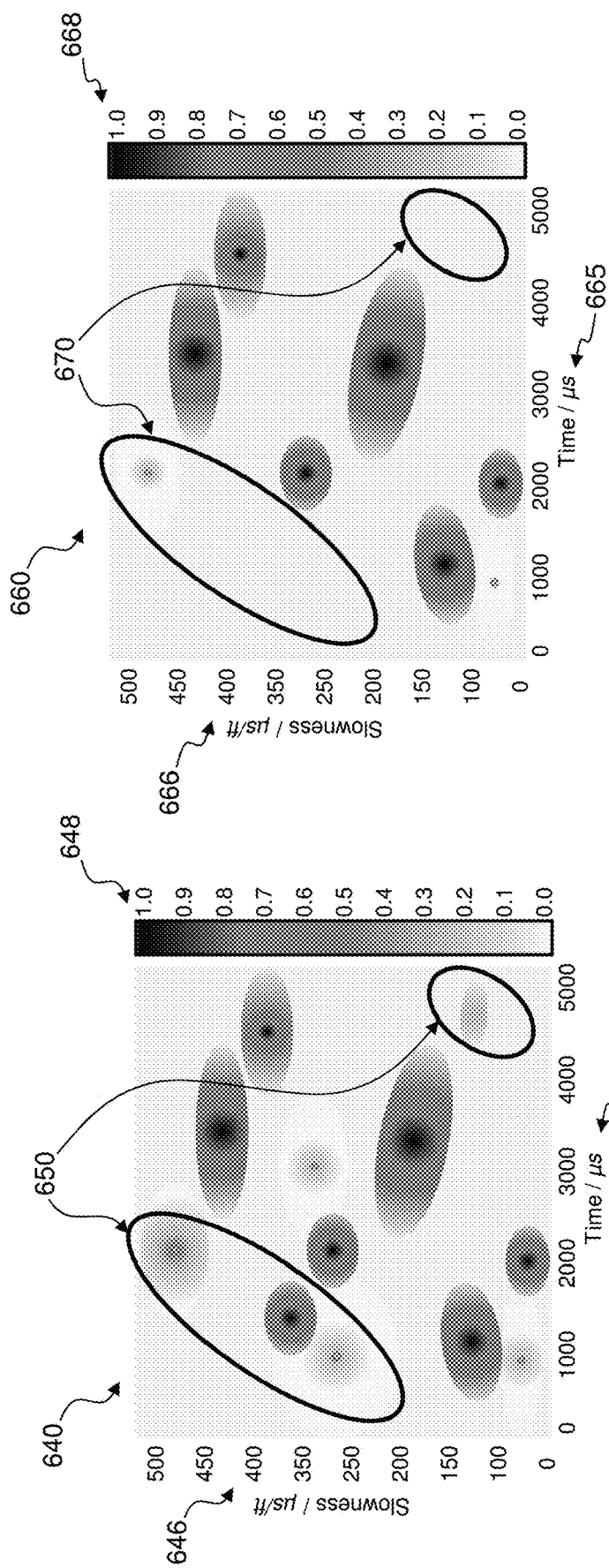
FIG. 6C is an illustration of a graph of an example semblance map demonstrating an LWD well system.
FIG. 6D is an illustration of a graph of an example semblance map after a time slowness adaptive data mask has been applied demonstrating an LWD well system.

FIG. 6C is an illustration of a graph of an example semblance map 640 demonstrating an LWD well system. Semblance map 640 includes an x-axis 645 indicating time in µs, and a y-axis 646 indicating slowness as µs/ft. A relative intensity reference 648 is shown to the side of semblance map 640. Waves from waveform plot 601 can be plotted on semblance map 640 resulting in a visualization of the semblance parameters. Alias data is indicated by black circles 650.

FIG. 6D is an illustration of a graph of an example semblance map 660 after the time slowness adaptive data mask has been applied demonstrating an LWD well system. The adaptive data mask generated as described for FIG. 6B can be applied to the semblance map 640 to generate semblance map 660. Semblance map 660 includes an x-axis 665 indicating time in µs, and a y-axis 666 indicating slowness as µs/ft. A relative intensity reference 668 is shown to the side of semblance map 660. Waves from waveform plot 601 can be plotted on semblance map 660 resulting in a visualization of the semblance parameters. Alias data is indicated by black circles 670. The alias data, as shown by black circles 670, is significantly less intense as compared to the original alias data as shown by black circles 650. The semblance map 660 has been simplified visually since the adaptive data mask suppressed the alias peaks due to the respectively smaller amplitude parameters. The masking or suppression allows for the alias data to contribute a reduced weighted amount to the slowness parameter. In some aspects, a threshold parameter can be used to eliminate alias values that fail to satisfy the threshold parameter.

Figure 7B:
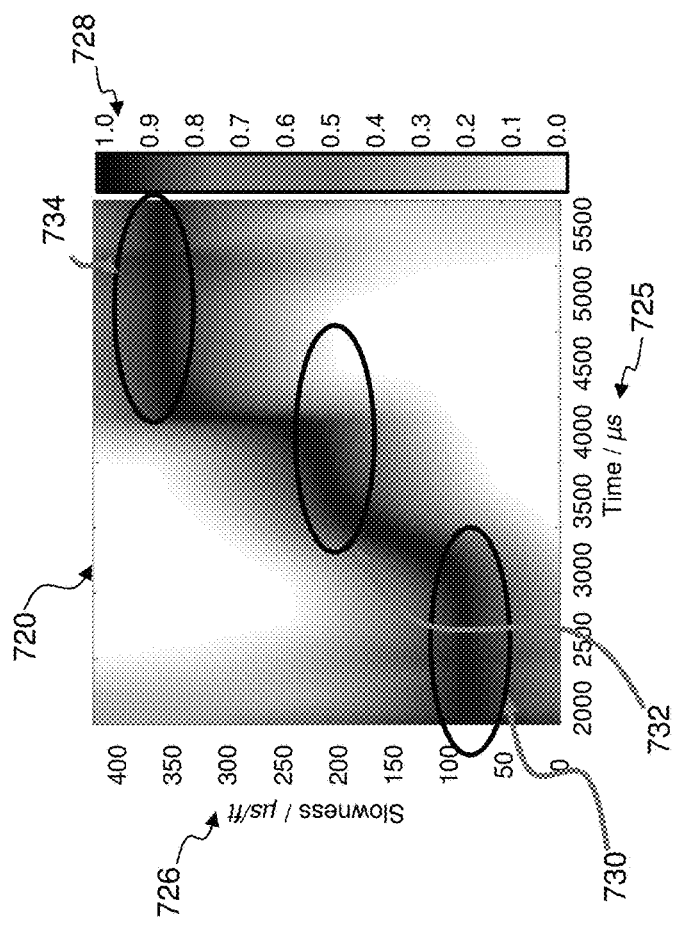
FIG. 7B is an illustration of a graph of an example semblance map of the instantaneous amplitude.
Figure 7A:
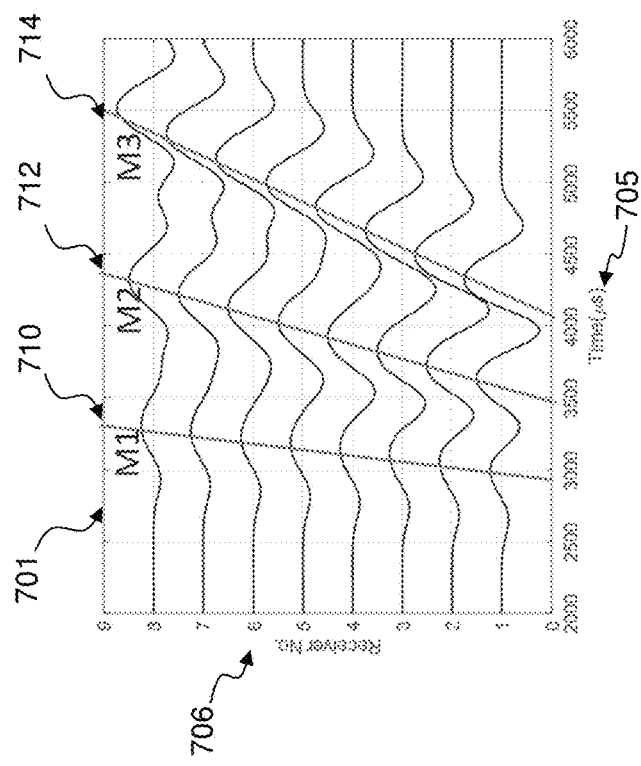
FIG. 7A is an illustration of a graph of an example plot of sonic logging data waveforms using an instantaneous amplitude correlation data mask with multiple modes.

FIG. 7A is an illustration of a graph of an example waveform plot 701, of sonic logging data, using an instantaneous amplitude correlation data mask with multiple modes. Waveform plot 701 represents the instantaneous amplitude of the waveforms in FIG. 5A. 501, after a low frequency bandpass filter, for example 1~3 kHz (kilohertz) is applied. The filter can keep the propagation feature of the wave amplitude. Waveform plot 701 is demonstrating multiple modes for an amplitude correlation algorithm. Waveform plot 701 has an x-axis 705 indicating time in µs, and a y-axis 706 indicating receivers by an identification number. Each receiver has detected sonic logging data, the process has transformed the data to waveforms and has indicated an approximate amplitude around each receiver indicator line. There are three modes depicted, modes 710, 712, and 714, corresponding to slowness lines 507, 508, 509 in FIG. 5A, respectively. There can be one or more modes, depending on the data generated by the sonic tool. In some aspects, filtered amplitude arrays can also be depicted.

FIG. 7B is an illustration of a graph of an example semblance map 720 of the instantaneous amplitude of FIG. 5A. Semblance map 720 includes an x-axis 725 indicating time in µs, and a y-axis 726 indicating slowness as µs/ft. A relative intensity reference 728 is shown to the side of semblance map 720. Waves from waveform plot 501 or waveform plot 701 can be plotted on semblance map 720 resulting in a visualization of the semblance parameters. The three modes are indicated by 730, 732, and 734. Few alias data elements are indicated on the semblance map 720.

FIG. 7C is an illustration of a graph of an example adaptive data mask 740 for an instantaneous amplitude aspect. Utilizing Equation 8, the adaptive data mask 740 can be generated from semblance map 720. A threshold parameter of about 0.35 was used for this example. Threshold parameters can range from 0.0 to 1.0 on the intensity reference 748. Adaptive data mask 740 includes an x-axis 745 indicating time in µs, and a y-axis 746 indicating slowness as µs/ft.

FIG. 7D is an illustration of a graph of an example semblance map 760, based on FIG. 5B, after an instantaneous amplitude correlation data mask has been applied. Semblance map 760 includes an x-axis 765 indicating time in µs, and a y-axis 766 indicating slowness as µs/ft. A relative intensity reference 768 is shown to the side of semblance map 760. Modes 730, 732, and 734 indicate the time slowness parameters for the three modes respectively. The alias data has been suppressed from semblance map 760.

FIGS. 2-7 demonstrate a visualization of the waveform data and a depiction of the waveform data using an intensity reference. In some aspects, a visualization of the data can be generated for human information consumption, such as for display on a monitor, projection, printed, or in other human readable forms. In other aspects, the processes described herein can be processed within a computing system without a visualization component. The output can be one or more of information provided to other computing systems and analysis provided for human information consumption.

Figure 8:
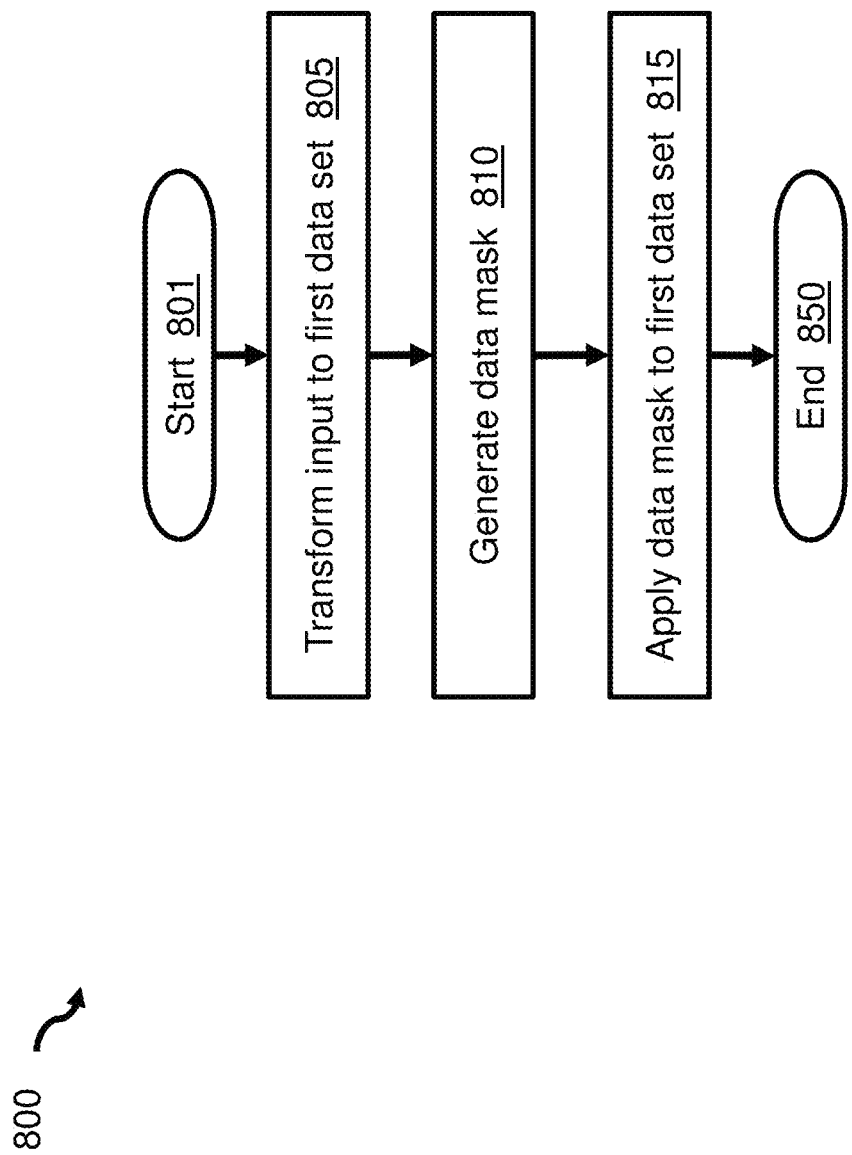
FIG. 8 is an illustration of a flow diagram of an example method to process sonic logging data waveforms.

FIG. 8 is an illustration of a flow diagram of an example method 800 to process sonic logging data waveforms. Method 800 starts at a step 801 and proceeds to a step 805. In a step 805 the collected data can be transformed into a first data set with a format suitable for further processing. In some aspects, transforming can transform the detected data into processable waveform data. The raw sonic logging data that was detected by receivers can be transformed into a first data set that can be analyzed and processed by the methods described herein.

Proceeding to a step 810, an adaptive data mask can be generated from the first data set. The process can analyze the amplitude intensity to determine an appropriate adaptive data mask to generate. Since the adaptive data mask utilizes the amplitude map, the adaptive data mask is adaptive to the current data set being analyzed. Proceeding to a step 815, the adaptive data mask can be applied to the semblance map generated from the first data set. The adaptive data mask can suppress or de-emphasize alias data from the semblance map. In an alternative aspect, a threshold parameter can be applied to remove data values that fail to satisfy the threshold criteria. The method ends at a step 850.

Figure 9:
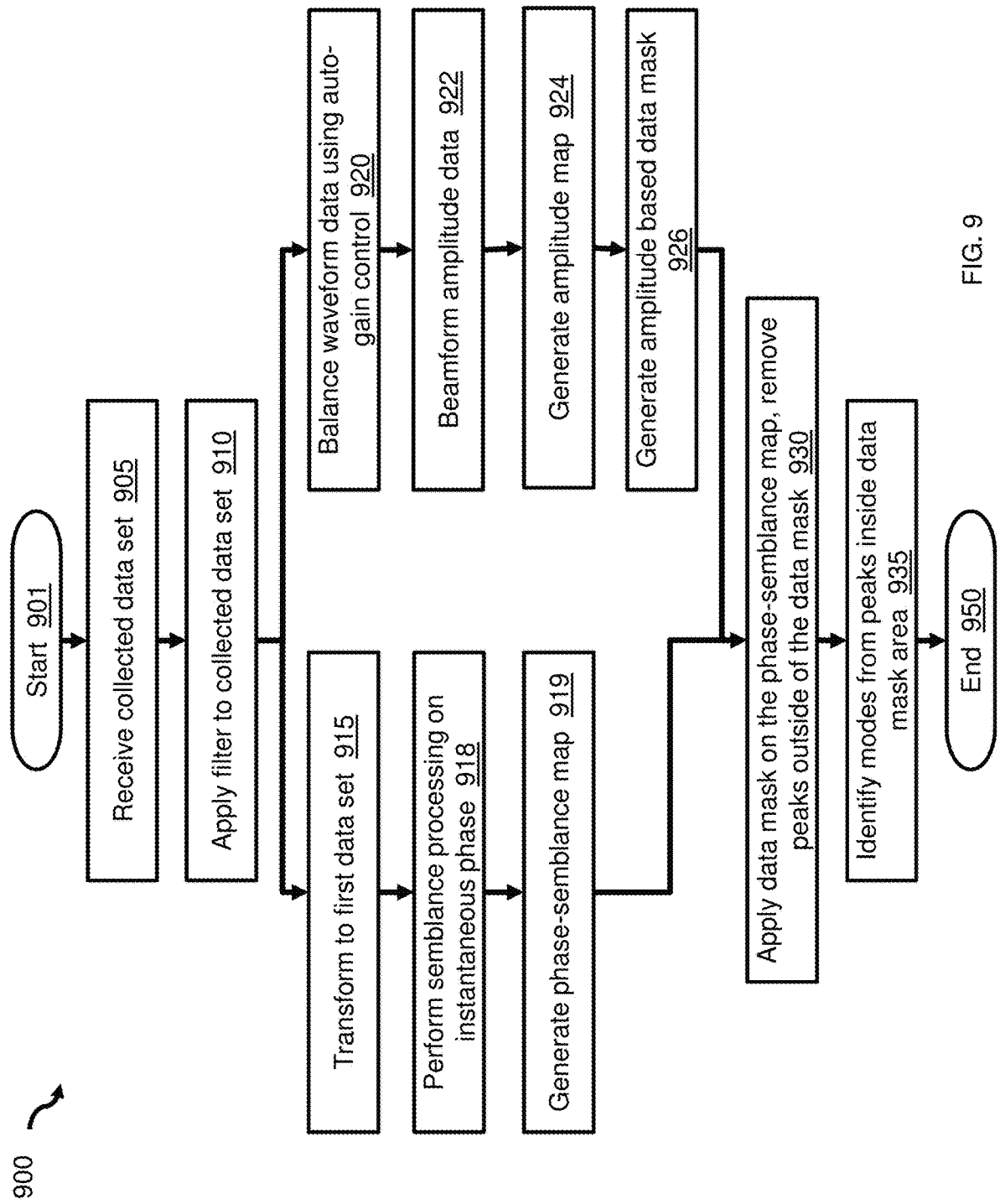
FIG. 9 is an illustration of a flow diagram of an example method for array waveform data processing with an adaptive data mask.

FIG. 9 is an illustration of a flow diagram of an example method 900 for array waveform data processing with an adaptive data mask. The method 900 starts at a step 901 and proceeds to a step 905. In a step 905 a collected data set is received, such as from a sonic tool or from a data source of previously collected sonic logging data. The collected data set can be collected from receivers which detected the sonic logging data. In a step 910 the collected data is filtered, for example to reduce noise and to remove non-target modes by a digital time-domain filter or a frequency-wavenumber (F-K) filter. Proceeding from step 910, the method can proceed to a step 915 and a step 920 simultaneously, in parallel, or other orders.

Proceeding to the step 915, the collected data set can be transformed to a first data that can be processable by the algorithms and methods described herein. In a step 918 semblance processing can be performed on the instantaneous phase of the first data set. In a step 919, a phase-semblance map can be generated.

Proceeding to the step 920, the waveform data can be balanced using an autogain control. In a step 922, a data set can be generated using beamforming, i.e., beam stacking. In a step 924, the amplitude map can be generated from the data set generated in step 922. In a step 926, the adaptive data mask can be generated by analyzing the amplitude map.

After step 919 and step 926 have completed, the method 900 proceeds to a step 930. In the step 930, the adaptive data mask generated in step 926 can be applied to the phase-semblance map generated in step 919. The adaptive data mask can suppress intensity peaks outside of the adaptive data mask area. In a step 935, intensity peaks inside the adaptive data mask area can be identified for further analysis. The method 900 ends at a step 950.

Figure 10:
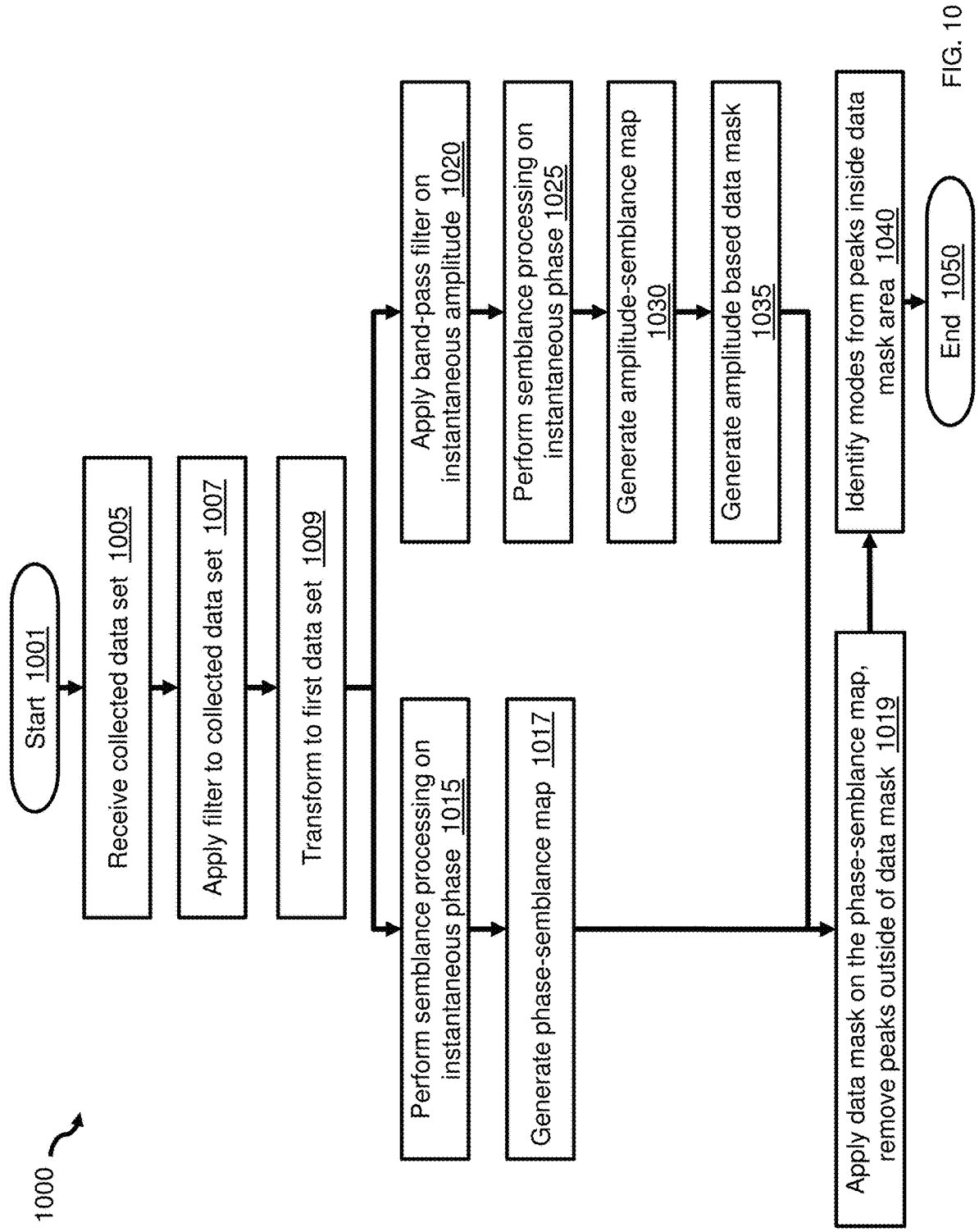
FIG. 10 is an illustration of a flow diagram of an example method for array waveform data processing using an instantaneous amplitude correlation map.

FIG. 10 is an illustration of a flow diagram of an example method 1000 for array waveform data processing using an instantaneous amplitude correlation map. Method 1000 starts at a step 1001 and proceeds to a step 1005. In the step 1005 a collected data set is received, such as from a sonic tool or from a data source of previously collected sonic logging data. In a step 1007 a filter can be applied to the collected data set, for example, by a digital time-domain filter or a frequency-wavenumber (F-K) filter to reduce noises or to un-target waves. In a step 1009, the filtered collected data can be transformed into a first data set that is further processable by the method 1000. Proceeding from step 1009 is a step 1015 and a step 1020.

Proceeding to the step 1015, semblance processing can be performed on the instantaneous phase of the first data set. Instantaneous phase is the complex argument function of the analytic representation of the raw waveform signals. In a step 1017, the phase-semblance map can be generated.

Proceeding to the step 1020, a band-pass filter can be applied on the instantaneous amplitude derived from the first data set. The band-pass filter might be a frequency domain filter or a frequency-wavenumber domain filter, with which target waves can be enhanced while noise and nontarget waves can be suppressed. In a step 1025, semblance processing can be performed on the instantaneous phase. In a step 1030, an amplitude-semblance map can be generated. In a step 1035, an adaptive data mask can be generated from the amplitude-semblance map.

After step 1017 and step 1035 have completed, the method 1000 proceeds to a step 1019. In the step 1019, the adaptive data mask can be applied to the phase-semblance map. Intensity peaks outside of the adaptive data mask area can be suppressed or removed. Proceeding to a step 1040, the intensity peaks inside the adaptive data mask area can be identified for further processing. The method 1000 ends at a step 1050.

Methods 800, 900, and 1000 describe using waveforms, semblance maps, amplitude maps, and various types of data masks. These methods can be implemented within a computing device where the waveforms, semblance maps, amplitude maps, and data masks are represented by sets of data and algorithms that operate on the detected and collected sonic logging data. Maps and data masks do not need a visualization component, and can be an implemented via algorithms, data processing systems, and functional processing.

Figure 11:
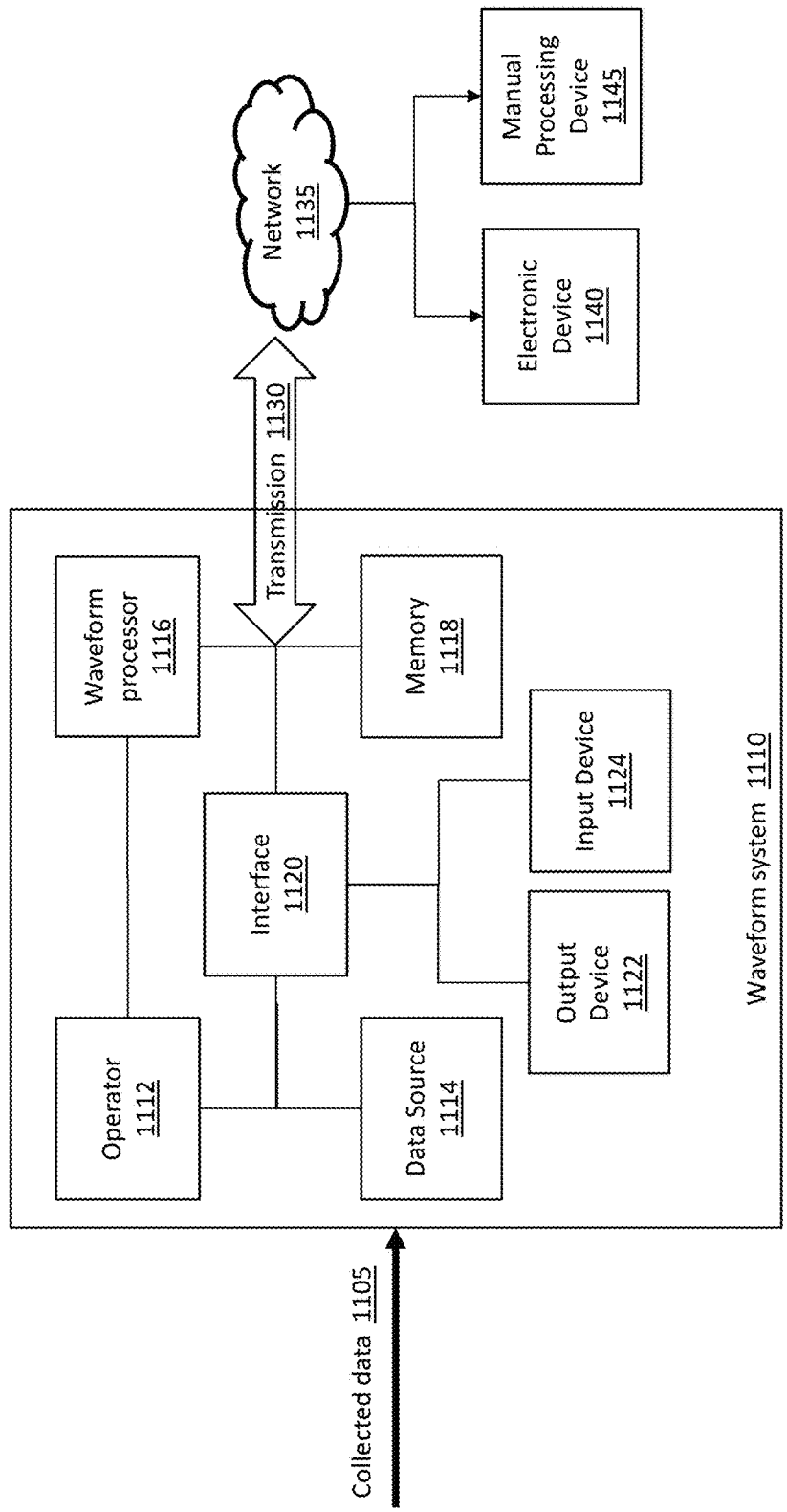
FIG. 11 is an illustration of a block diagram of an example waveform processing system.

FIG. 11 is an illustration of a block diagram of an example waveform processing system 1100, such as an adaptive data mask system, an instantaneous amplitude correlation system, and other types of sonic logging data processing systems. The methods, or at least some of the steps of the methods, described herein can be executed on waveform processing system 1110. Waveform processing system 1110 includes operator 1112, data source 1114, waveform processor 1116, memory 1118, interface 1120, output device 1122, and input device 1124. These components, for an implementation, can be combined or separated in various combinations. These components can exist localized in a single system or be separated a distance from the others in multiple systems, wherein the components are communicatively coupled to the other system components. For example, data source 1114 can exist in a database located a distance away from the other system components, while being communicatively coupled so that the other components can retrieve appropriate data from data source 1114.

Waveform processing system 1110 is communicatively coupled to a network 1135 through transmission 1130. Network 1135 can be a network of various types, such as a wired, wireless, or other type of network. The network 1135 is further communicatively coupled with other systems and devices, such as electronic computing devices 1140 and manual processing devices 1145. Electronic computing device 1140 can be a device, for example, a laptop, smartphone, or other device, or electronic computing device 1140 can represent systems of devices, for example a separate data center or cloud-based environment. The network 1135 can also be communicatively coupled to manual processing devices 1145, for example, a printer, a monitor, or other types of devices that can be interacted with by humans.

Operator 1112 is capable to send and receive data elements and information to/from other systems and to retrieve a set of collected data 1105, such as collected data from a sonic tool or from a data source where previously collected sonic logging data is stored. Operator 1112 can store the collected data in data source 1114. Operator 1112 can control the other waveform processing system 1110 components, direct their operation, and control communications with other systems. Data source 1114 can store the collected data set, interim data sets, a final processed data set, and can store other algorithm information and analysis, for example, a threshold parameter.

Waveform processor 1116 is capable to execute methods and algorithms to generate the waveforms, semblance maps, amplitude maps, and various types of data masks. Waveform processor 1116 can also execute methods and algorithms described herein on a functional basis, without visualization components. The maps and data masks can be data elements that are manipulated rather than a visualization implementation. The waveform processor 1116 can be configured to transform sonic logging data to a first data set that targets a time slowness domain, generate an adaptive data mask that utilizes an amplitude analysis of the first data set, and compute a second data set utilizing the adaptive data mask, wherein the second data set represents a semblance analysis.

Memory 1118 is capable to store the data sets, information, threshold parameters, operating instructions, algorithms, and programming logic. Interface 1120 is capable of communicating with one or more systems through transmission 1130. For example, interface 1120 can communicate with a network 1135 which in turn can communicate with electronic computing device 1140 or manual processing device 1145. The interface 1120 can also communicate with output device 1122 and input device 1124, if they are present.

Output device 1122 can be an optional component and can include, for example, a monitor, printer, or other devices. Typically, a well system engineer or a well system operator can be the recipient of the output device 1122 information. Other users can receive the output information as well. Input device 1124 can be an optional component and can be a device that can provide input data or instructions to the waveform processing system 1110. For example, input device 1124 can be a keyboard, mouse, touchscreen, scanner, or other types of input devices. Example inputs can be a threshold parameter or constraints on the adaptive data mask generation. Typically, a well system engineer or a well system operator can input the information through the input device 1124. Other users can provide the input as well.

A portion of the above-described apparatus, systems or methods may be embodied in or performed by various digital data processors or computers, wherein the computers are programmed or store executable programs of sequences of software instructions to perform one or more of the steps of the methods. The software instructions of such programs may represent algorithms and be encoded in machine-executable form on non-transitory digital data storage media, e.g., magnetic or optical disks, random-access memory (RAM), magnetic hard disks, flash memories, and/or read-only memory (ROM), to enable various types of digital data processors or computers to perform one, multiple or all of the steps of one or more of the above-described methods, or functions, systems or apparatuses described herein.

Portions of disclosed embodiments may relate to computer storage products with a non-transitory computer-readable medium that have program code thereon for performing various computer-implemented operations that embody a part of an apparatus, device or carry out the steps of a method set forth herein. Non-transitory used herein refers to all computer-readable media except for transitory, propagating signals. Examples of non-transitory computer-readable media include, but are not limited to: magnetic media such as hard disks, floppy disks, and magnetic tape; optical media such as CD-ROM disks; magneto-optical media such as floptical disks; and hardware devices that are specially configured to store and execute program code, such as ROM and RAM devices. Examples of program code include both machine code, such as produced by a compiler, and files containing higher level code that may be executed by the computer using an interpreter.

In interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

Those skilled in the art to which this application relates will appreciate that other and further additions, deletions, substitutions and modifications may be made to the described embodiments. It is also to be understood that the terminology used herein is for the purpose of describing particular embodiments only, and is not intended to be limiting, since the scope of the present disclosure will be limited only by the claims. Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, a limited number of the exemplary methods and materials are described herein.

It is noted that as used herein and in the appended claims, the singular forms "a", "an", and "the" include plural referents unless the context clearly dictates otherwise.

Aspects disclosed herein include:

A. A method of processing sonic logging data detected by a sonic tool in a well system to minimize an influence of alias data, including: (1) transforming to a first data set the sonic logging data, wherein the transforming targets a time slowness domain, (2) generating an adaptive data mask, wherein the adaptive data mask utilizes an amplitude analysis of the first data set, and (3) computing a second data set, utilizing the adaptive data mask, wherein the second data set represents a semblance analysis.

B. A computer program product having a series of operating instruction stored on a non-transitory computer-readable medium that direct a data processing apparatus when executed thereby to perform operations to process sonic logging data detected from a well system, having operations including: (1) transforming the sonic logging data to a first data set, wherein the transforming targets a time slowness domain, (2) generating an adaptive data mask, wherein the adaptive data mask utilizes an amplitude analysis of the first data set, and (3) computing a second data set, utilizing the adaptive data mask, wherein the second data set represents a semblance analysis.

C. A waveform processing system for sonic logging data for a well system including: (1) a data source, configured to store the sonic logging data, and (2) a processor, configured to transform the sonic logging data to a first data set that targets a time slowness domain, generate an adaptive data mask that utilizes an amplitude analysis of the first data set, and compute a second data set utilizing the adaptive data mask, wherein the second data set represents a semblance analysis.

Each of aspects A, B, and C can have one or more of the following additional elements in combination:

Element 1: wherein the amplitude analysis is generated utilizing beamforming. Element 2: wherein the amplitude analysis is generated utilizing instantaneous amplitude correlation between receivers. Element 3: wherein the data mask is automatically adjusted to subterranean formation conditions. Element 4: wherein the computing the second data set utilizes a threshold parameter. Element 5: wherein data values from the first data set that fail to satisfy the threshold parameter are suppressed. Element 6: wherein the threshold parameter is determined as a fractional proportion of a peak intensity value within the first data set. Element 7: wherein a time interval is utilized in the generating the adaptive data mask. Element 8: wherein the first data set includes one or more data modes, and the second data set includes the same data modes. Element 9: further includes, balancing waveform data of the first data set utilizing an auto-gain control. Element 10: further includes using the sonic tool in the well system, prior to the transforming. Element 11: further includes transmitting the second data set to at least one of a system, operator, printer, and display.

Element 12: wherein the computing the second data set identifies modes and subterranean formation characteristics, and the modes and the subterranean formation characteristics are included in the second data set. Element 13: wherein more than one adaptive data mask can be generated, and one or more of the adaptive data masks can be utilized in combination for the computing the second data set. Element 14: wherein the generating an adaptive data mask further includes applying a band-pass filter to the first data set. Element 15: wherein the generating an adaptive data mask further includes performing semblance processing on the first data set. Element 16: wherein the generating an adaptive data mask further includes generating an amplitude-semblance analysis utilizing the first data set. Element 17: wherein the generating an adaptive data mask further includes generating the adaptive data mask utilizing the first data set and the amplitude-semblance analysis. Element 18: wherein the generating an adaptive data mask further includes generating a phase-semblance analysis from semblance processing of the first data set. Element 19: wherein the applying the adaptive data mask utilizes the phase-semblance analysis. Element 20: further includes a sonic tool capable of generating the sonic logging data.

What is claimed is:

1. A method of processing sonic logging data detected by a sonic tool in a well system to minimize an influence of alias data, comprising:
   transforming to a first data set the sonic logging data, wherein the sonic logging data includes multiple modes and the transforming targets a time slowness domain for the multiple modes;
   generating an adaptive data mask, wherein the adaptive data mask utilizes an amplitude analysis of the multiple modes of the first data set; and
   computing a second data set utilizing the adaptive data mask, wherein the second data set represents a semblance analysis.

2. The method as recited in claim 1, wherein the amplitude analysis is generated utilizing beamforming.

3. The method as recited in claim 1, wherein the amplitude analysis is generated utilizing instantaneous amplitude correlation between receivers.

4. The method as recited in claim 1, wherein the adaptive data mask is automatically adjusted to subterranean formation conditions.

5. The method as recited in claim 1, wherein the computing the second data set utilizes a threshold parameter and data values from the first data set that fail to satisfy the threshold parameter are suppressed.

6. The method as recited in claim 5, wherein the threshold parameter is determined as a fractional proportion of a peak intensity value within the first data set.

7. The method as recited in claim 1, wherein a time interval is utilized in the generating the adaptive data mask.

8. The method as recited in claim 1, wherein the second data set includes the same multiple modes as the first data set.

9. The method as recited in claim 1, further comprising balancing waveform data of the first data set utilizing an auto-gain control.

10. The method as recited in claim 1, further comprising:
    using the sonic tool in the well system, prior to the transforming; and
    transmitting the second data set to at least one of a system, operator, printer, and
    display, wherein the computing the second data set identifies the multiple modes and subterranean formation characteristics, and the multiple modes and the subterranean formation characteristics are included in the second data set.

11. The method as recited in claim 1, wherein more than one adaptive data mask can be generated, and one or more of the adaptive data masks can be utilized in combination for the computing the second data set.

12. The method as recited in claim 1, wherein the generating the adaptive data mask further comprises:
    applying a band-pass filter to the first data set;
    performing semblance processing on the first data set;
    generating an amplitude-semblance analysis utilizing the first data set;
    generating the adaptive data mask utilizing the first data set and the amplitude-semblance analysis; and
    generating a phase-semblance analysis from semblance processing of the first data set, wherein the utilizing the adaptive data mask utilizes the phase-semblance analysis.

13. A computer program product having a series of operating instructions stored on a non-transitory computer-readable medium that directs a data processing apparatus when executed thereby to perform operations to process sonic logging data detected from a well system, having operations comprising:
    transforming the sonic logging data to a first data set, wherein the sonic logging data includes multiple modes and the transforming targets a time slowness domain for the multiple modes;
    generating an adaptive data mask, wherein the adaptive data mask utilizes an amplitude analysis of the multiple modes of the first data set; and
    computing a second data set utilizing the adaptive data mask, wherein the second data set represents a semblance analysis.

14. The computer program product as recited in claim 13, wherein the amplitude analysis is generated utilizing instantaneous amplitude correlation between receivers.

15. The computer program product as recited in claim 13, wherein the computing the second data set utilizes a threshold parameter, wherein data values from the first data set that fail to satisfy the threshold parameter are suppressed.

16. The computer program product as recited in claim 13, wherein the second data set includes the same multiple modes as the first data set.

17. The computer program product as recited in claim 13, wherein more than one adaptive data mask can be generated, and one or more of the adaptive data masks can be utilized in combination for the computing the second data set.

18. The computer program product as recited in claim 13, wherein the generating the adaptive data mask further comprises:
    applying a band-pass filter to the first data set;
    performing semblance processing on the first data set;
    generating an amplitude-semblance analysis utilizing the first data set;
    generating the adaptive data mask utilizing the first data set and the amplitude-semblance analysis; and
    generating a phase-semblance analysis from semblance processing of the first data set, wherein the utilizing the adaptive data mask utilizes the phase-semblance analysis.

19. A waveform processing system for sonic logging data for a well system comprising:
    a data source, configured to store the sonic logging data; and a processor configured to transform the sonic logging data to a first data set that targets a time slowness domain, automatically generate an adaptive data mask utilizing an amplitude analysis of the first data set, and compute a second data set utilizing the adaptive data mask, wherein the second data set represents a semblance analysis.

20. The waveform processing system as recited in claim 19, further comprising a sonic tool capable of generating the sonic logging data.

* * * * *

UNITED STATES PATENT AND TRADEMARK OFFICE
CERTIFICATE OF CORRECTION

PATENT NO.         : 11,112,526 B2
APPLICATION NO.    : 16/731655
DATED              : September 7, 2021
INVENTOR(S)        : Ruijia Wang It is certified that error appears in the above-identified patent and that said Letters Patent is hereby corrected as shown below:

In the Specification

Column 5, Line 35, after "into a" insert --4--

Signed and Sealed this
First Day of February, 2022

Drew Hirshfeld
*Performing the Functions and Duties of the*
*Under Secretary of Commerce for Intellectual Property and*
*Director of the United States Patent and Trademark Office*

UNITED STATES PATENT AND TRADEMARK OFFICE
CERTIFICATE OF CORRECTION

PATENT NO. : 11,112,526 B2
APPLICATION NO. : 16/731655
DATED : September 7, 2021
INVENTOR(S) : Ruijia Wang Page 1 of 1

It is certified that error appears in the above-identified patent and that said Letters Patent is hereby corrected as shown below:

On the Title Page

After item (65)
"Prior Publication Date
US 2020/0271821 A1 Aug. 27, 2020"
Insert Item (30):
--Foreign Application Priority Data
Aug. 27, 2020 WO ............PCT/US2019/018935--

Signed and Sealed this
Twenty-first Day of May, 2024

Katherine Kelly Vidal
*Director of the United States Patent and Trademark Office*